(12) United States Patent
Chartier et al.

(10) Patent No.: US 12,420,748 B2
(45) Date of Patent: Sep. 23, 2025

(54) WHEEL CHOCK HANDLING UNIT AND METHOD

(71) Applicant: 9172-9863 QUEBEC INC., Terrebonne (CA)

(72) Inventors: Albert Chartier, Chertsey (CA); Catalin Dumitrascu, Laval (CA); Daniel Grothe, Terrebonne (CA); Gregory Palmer, Mascouche (CA); Jean-Francois Lepage, Mascouche (CA); Gaetan Jette, Mascouche (CA); Emanuel Lallemant, Saint-Colomban (CA)

(73) Assignee: 9172-9863 Quebec Inc., Terrebonne (CA)

( * ) Notice: Subject to any disclaimer, the term of this patent is extended or adjusted under 35 U.S.C. 154(b) by 582 days.

(21) Appl. No.: 17/314,859

(22) Filed: May 7, 2021

(65) Prior Publication Data

US 2021/0261101 A1    Aug. 26, 2021

Related U.S. Application Data

(63) Continuation of application No. PCT/CA2019/051607, filed on Nov. 12, 2019.

(Continued)

(51) Int. Cl.
*B60T 3/00* (2006.01)
*F16M 13/02* (2006.01)

(52) U.S. Cl.
CPC ............ *B60T 3/00* (2013.01); *F16M 13/022* (2013.01)

(58) Field of Classification Search
CPC .... B60T 3/00; B60T 1/14; B60T 1/005; B64F 1/16; B60P 3/077; B60P 3/075;
(Continued)

(56) References Cited

U.S. PATENT DOCUMENTS

| | | | |
|---|---|---|---|
| 918,276 | A | 4/1909 | Browne |
| 1,496,965 | A | 6/1924 | Aldeen |

(Continued)

FOREIGN PATENT DOCUMENTS

| | | |
|---|---|---|
| CA | 2164737 A1 | 6/1997 |
| CA | 2164738 A1 | 3/2009 |

(Continued)

OTHER PUBLICATIONS

Machine translation in English of FR2832113.
(Continued)

*Primary Examiner* — Robert A. Siconolfi
*Assistant Examiner* — Mahbubur Rashid
(74) *Attorney, Agent, or Firm* — RYAN, KROMHOLZ & MANION, SC

(57) ABSTRACT

The wheel chock handling unit includes a base, an articulated cantilever arm assembly, a main spring assembly and a force-compensation mechanism. The arm assembly has a first end pivotally mounted to the base for angular displacement of the arm assembly in a substantially vertical plane between a storage position and an extended position. It also has a second end receiving a wheel chock. The main spring assembly extends between the arm assembly and the base. The force-compensation mechanism includes a lever pivotally mounted to the base for angular displacement in a plane that is substantially parallel to that of the arm assembly.

16 Claims, 30 Drawing Sheets

Related U.S. Application Data

(60) Provisional application No. 62/758,305, filed on Nov. 9, 2018.

(58) Field of Classification Search
CPC ........ B60P 3/073; B60P 7/0892; B60R 25/09; F16M 13/022
See application file for complete search history.

(56) References Cited

U.S. PATENT DOCUMENTS

| | | |
|---|---|---|
| 2,090,439 A | 8/1937 | Carwardine |
| 2,316,178 A | 4/1943 | Morgensen, Jr. |
| 2,345,251 A | 3/1944 | Foster |
| 2,413,744 A | 1/1947 | Carter |
| 2,465,551 A | 3/1949 | Otterness |
| 2,480,864 A | 9/1949 | Loepsinger |
| 2,535,305 A | 12/1950 | Loepsinger |
| 2,644,255 A | 7/1953 | Foster |
| 2,648,146 A | 8/1953 | Foster |
| 2,680,311 A | 6/1954 | Foster |
| 2,697,494 A | 12/1954 | Parks |
| 2,700,524 A | 1/1955 | Lauterbach |
| 2,712,425 A | 7/1955 | Ruemelin |
| 2,771,162 A | 11/1956 | Marsh |
| 2,834,568 A | 5/1958 | Foster |
| 2,835,349 A | 5/1958 | Veselik et al. |
| 2,858,905 A | 11/1958 | Fahland |
| 2,896,888 A | 7/1959 | Wood |
| 2,903,213 A | 9/1959 | Suozzo |
| 2,939,229 A | 6/1960 | Foster |
| 2,946,547 A | 7/1960 | Grabe |
| 2,954,101 A | 9/1960 | Corson |
| 2,995,326 A | 8/1961 | Wood |
| 3,065,827 A | 11/1962 | Timbers |
| 3,074,569 A | 1/1963 | Ajero |
| 3,077,247 A | 2/1963 | West et al. |
| 3,119,466 A | 1/1964 | Gilson |
| 3,120,292 A | 2/1964 | Rambat |
| 3,157,194 A | 11/1964 | Stolte |
| 3,179,362 A | 4/1965 | Wright |
| 3,189,127 A | 6/1965 | Karnow et al. |
| 3,258,088 A | 6/1966 | Bowen |
| 3,305,049 A | 2/1967 | Willey |
| 3,321,046 A | 5/1967 | Cooper |
| 3,395,503 A | 8/1968 | Greenburg et al. |
| 3,425,517 A | 2/1969 | Speir |
| 3,426,190 A | 2/1969 | Bobrick |
| 3,542,157 A | 11/1970 | Noah |
| 3,581,846 A | 6/1971 | Janus |
| 3,664,466 A | 5/1972 | Rotheiser |
| 3,666,119 A | 5/1972 | Parsons |
| 3,695,394 A | 10/1972 | Carpenter |
| 3,700,077 A | 10/1972 | Harder |
| 3,734,241 A | 5/1973 | Hale |
| 3,774,873 A | 11/1973 | Krogsrud |
| 3,845,844 A | 11/1974 | Woerner |
| 3,845,845 A | 11/1974 | Geisthoff |
| 3,907,072 A | 9/1975 | Shafer |
| 4,080,530 A | 3/1978 | Krogsrud |
| 4,082,244 A | 4/1978 | Groff |
| 4,155,429 A | 5/1979 | Schessl |
| 4,155,523 A | 5/1979 | Morford et al. |
| 4,160,536 A | 7/1979 | Krogsrud |
| 4,191,503 A | 3/1980 | Neff et al. |
| 4,207,019 A | 6/1980 | Cone |
| 4,217,831 A | 8/1980 | Koliba et al. |
| 4,221,353 A | 9/1980 | Kuhn et al. |
| 4,266,747 A | 5/1981 | Souder, Jr. et al. |
| 4,277,044 A | 7/1981 | Hamilton |
| 4,399,893 A | 8/1983 | Switzer |
| 4,441,586 A | 4/1984 | Bernier |
| 4,555,211 A | 11/1985 | Metz |
| 4,582,176 A | 4/1986 | Roberts |
| 4,620,829 A | 11/1986 | Herve |
| 4,641,994 A | 2/1987 | Hankison |
| 4,674,929 A | 6/1987 | Blunden |
| 4,676,344 A | 6/1987 | Locicero |
| 4,682,922 A | 7/1987 | Andre et al. |
| 4,739,863 A | 4/1988 | Stauffer |
| 4,781,271 A | 11/1988 | Wokeck |
| 4,784,567 A | 11/1988 | Hageman et al. |
| 4,804,070 A | 2/1989 | Bohler |
| 4,804,302 A | 2/1989 | Andre |
| 4,833,442 A | 5/1989 | Von Heck |
| 4,846,434 A | 7/1989 | Krogsrud |
| 4,852,842 A | 8/1989 | O'Neill |
| 4,854,790 A | 8/1989 | Andre |
| 4,901,591 A | 2/1990 | Oppermann et al. |
| 4,934,489 A | 6/1990 | Jackson |
| 4,955,459 A | 9/1990 | Murphy |
| 4,963,068 A | 10/1990 | Gelder |
| 4,969,792 A | 11/1990 | Ellis et al. |
| 4,973,213 A | 11/1990 | Erlandsson |
| 5,018,687 A | 5/1991 | Kupfernagel et al. |
| 5,025,877 A | 6/1991 | Assh |
| 5,096,021 A | 3/1992 | Tart |
| D326,254 S | 5/1992 | Ziaylek, Jr. et al. |
| 5,143,333 A | 9/1992 | Warden |
| 5,170,975 A | 12/1992 | Chadwick |
| 5,173,018 A | 12/1992 | Kissel et al. |
| 5,249,905 A | 10/1993 | Warner et al. |
| 5,286,138 A | 2/1994 | Goodwin |
| 5,302,063 A | 4/1994 | Winsor |
| 5,312,213 A | 5/1994 | Winsor |
| 5,348,437 A | 9/1994 | Krupke et al. |
| 5,368,134 A | 11/1994 | Rickman et al. |
| 5,375,965 A | 12/1994 | Springer et al. |
| 5,381,680 A | 1/1995 | Rauch, Jr. |
| 5,392,880 A | 2/1995 | Christian |
| 5,410,897 A | 5/1995 | Edmondson |
| 5,427,209 A | 6/1995 | Tannehill et al. |
| 5,435,418 A | 7/1995 | Warren et al. |
| 5,520,034 A | 5/1996 | Edmondson |
| 5,531,557 A | 7/1996 | Springer |
| 5,547,045 A | 8/1996 | Stutzman |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles, Jr. et al. |
| 5,709,518 A | 1/1998 | Alexander et al. |
| 5,727,763 A | 3/1998 | Loriot |
| 5,743,697 A | 4/1998 | Alexander |
| 5,762,459 A | 6/1998 | Springer et al. |
| 5,803,208 A | 9/1998 | Blach |
| 5,878,940 A | 3/1999 | Rosenbalm |
| 5,901,816 A | 5/1999 | Camilleri |
| 5,902,082 A | 5/1999 | Kaemper |
| 5,934,857 A | 8/1999 | Alexander |
| 5,957,383 A | 9/1999 | Benest |
| D422,960 S | 4/2000 | Henry |
| 6,082,952 A | 7/2000 | Alexander |
| 6,092,970 A | 7/2000 | Hahn et al. |
| 6,095,344 A | 8/2000 | White |
| 6,112,353 A | 9/2000 | Winter |
| 6,123,496 A | 9/2000 | Alexander |
| 6,238,163 B1 | 5/2001 | Springer et al. |
| 6,250,432 B1 | 6/2001 | Hageman et al. |
| 6,290,029 B1 | 9/2001 | Gubler et al. |
| 6,336,527 B1 | 1/2002 | Metz |
| 6,357,987 B1 | 3/2002 | Palus |
| 6,368,043 B1 | 4/2002 | Leum et al. |
| 6,371,253 B1 | 4/2002 | Berends et al. |
| 6,378,956 B1 | 4/2002 | Van De Walker |
| 6,401,992 B1 | 6/2002 | Harrod et al. |
| 6,425,465 B1 | 7/2002 | Tallman et al. |
| 6,439,823 B1 | 8/2002 | Lambert |
| 6,505,713 B1 | 1/2003 | Paul et al. |
| 6,523,796 B2 | 2/2003 | Abramowsky et al. |
| 6,524,053 B2 | 2/2003 | Hahn et al. |
| 6,550,734 B1 | 4/2003 | Spadea |
| 6,585,211 B1 | 7/2003 | Hageman et al. |
| 6,589,003 B2 | 7/2003 | Berends |
| 6,648,148 B1 | 11/2003 | Bally |
| 6,676,360 B2 | 1/2004 | Springer et al. |

(56) References Cited

U.S. PATENT DOCUMENTS

| | | |
|---|---|---|
| 6,725,979 B1 | 4/2004 | Snook |
| 6,752,381 B2 | 6/2004 | Colak et al. |
| 6,773,221 B2 | 8/2004 | Belongia et al. |
| 6,835,034 B2 | 12/2004 | Winsor |
| 6,851,523 B1 | 2/2005 | Gaster |
| 6,863,481 B2 | 3/2005 | Pingel |
| 6,896,230 B2 | 5/2005 | Cvek |
| 6,926,480 B2 | 8/2005 | Anderson et al. |
| 6,938,734 B2 | 9/2005 | Curl |
| 6,948,593 B2 | 9/2005 | Horton |
| 6,978,865 B2 | 12/2005 | Fougere |
| 7,000,740 B2 | 2/2006 | Chrisco et al. |
| 7,032,720 B2 | 4/2006 | Jette et al. |
| 7,036,637 B1 | 5/2006 | Wiens |
| 7,044,698 B2 | 5/2006 | Winsor |
| 7,128,508 B2 | 10/2006 | Anderson et al. |
| 7,168,527 B2 | 1/2007 | Bateman |
| 7,226,265 B2 | 6/2007 | Wilson |
| 7,264,092 B2 * | 9/2007 | Jette ................ B65G 69/005 188/32 |
| 7,284,641 B1 | 10/2007 | Spence, III |
| 7,299,902 B2 | 11/2007 | Thorpe |
| 7,316,043 B2 | 1/2008 | Henblad et al. |
| 7,537,095 B2 | 5/2009 | Eriksson |
| 7,586,401 B2 | 9/2009 | Payne |
| 7,632,052 B2 | 12/2009 | Tatina |
| D633,850 S | 3/2011 | Morin |
| 7,914,042 B2 | 3/2011 | Andersen et al. |
| 7,958,973 B2 | 6/2011 | Swasand |
| D644,159 S | 8/2011 | Marcum |
| 7,999,680 B2 | 8/2011 | Penot |
| 8,006,811 B2 | 8/2011 | Andersen et al. |
| 8,047,751 B2 | 11/2011 | Powers et al. |
| 8,074,949 B2 | 12/2011 | Oddsen, Jr. et al. |
| 8,104,588 B2 | 1/2012 | Curlee et al. |
| 8,286,757 B2 | 10/2012 | Nelson |
| 8,286,997 B2 | 10/2012 | Kimener et al. |
| 8,307,956 B2 | 11/2012 | Andersen et al. |
| 8,342,467 B2 | 1/2013 | Stachowski et al. |
| 8,365,875 B2 | 2/2013 | Garceau |
| 8,443,945 B2 | 5/2013 | Perkins |
| 8,464,846 B2 | 6/2013 | Andersen et al. |
| 8,465,245 B2 | 6/2013 | Manone et al. |
| 8,499,897 B2 | 8/2013 | Brooks et al. |
| 8,499,899 B2 | 8/2013 | Scott |
| 8,528,929 B2 | 9/2013 | Kimener |
| 8,562,264 B2 | 10/2013 | Winsor |
| 8,590,673 B2 | 11/2013 | Andersen et al. |
| 8,590,674 B2 * | 11/2013 | Jette ................ B60T 3/00 188/4 R |
| 8,657,078 B2 | 2/2014 | Wolfram |
| 8,662,803 B2 | 3/2014 | Bowman et al. |
| 8,690,501 B2 | 4/2014 | Bullock |
| 8,779,948 B2 | 7/2014 | Faus et al. |
| 8,783,608 B2 | 7/2014 | Affre De Saint Rome |
| 8,807,291 B2 | 8/2014 | Saubade |
| 8,826,963 B2 | 9/2014 | Wiegel et al. |
| 8,831,970 B2 | 9/2014 | Weik, III et al. |
| 8,857,574 B2 | 10/2014 | De Jong |
| 8,869,948 B2 | 10/2014 | Saliger et al. |
| 8,887,874 B2 | 11/2014 | Bellota |
| D720,278 S | 12/2014 | Pinkall |
| 8,905,198 B2 | 12/2014 | Brooks et al. |
| 9,010,501 B2 | 4/2015 | Brooks et al. |
| 9,073,472 B2 | 7/2015 | Hellenschmidt et al. |
| 9,079,523 B2 | 7/2015 | Morin |
| 9,126,775 B2 | 9/2015 | Brooks et al. |
| 9,139,384 B2 | 9/2015 | Brooks, IV et al. |
| 9,162,831 B2 | 10/2015 | De Jong |
| 9,212,797 B2 | 12/2015 | Jeong |
| 9,222,616 B2 | 12/2015 | Ergun et al. |
| 9,290,336 B2 | 3/2016 | Ballester |
| 9,877,792 B2 | 1/2018 | Cooper |
| 9,903,526 B2 | 2/2018 | Roberts et al. |
| 9,909,851 B2 | 3/2018 | Lanigan, Sr. et al. |
| D830,280 S | 10/2018 | Erickson |
| 10,179,572 B2 | 1/2019 | Metz et al. |
| D855,005 S | 7/2019 | Delancey et al. |
| 10,393,627 B2 | 8/2019 | Etches et al. |
| 10,501,058 B2 | 12/2019 | Rancourt et al. |
| D873,196 S | 1/2020 | Harrington |
| 10,625,961 B2 | 4/2020 | De Jong |
| D892,706 S | 8/2020 | Sveum et al. |
| 10,793,119 B2 | 10/2020 | Jette et al. |
| 10,864,895 B2 | 12/2020 | Palmer et al. |
| 11,007,920 B2 | 5/2021 | Vande Sande et al. |
| 11,046,298 B1 | 6/2021 | Desmarais et al. |
| 2001/0026751 A1 | 10/2001 | Berends |
| 2004/0108172 A1 | 6/2004 | Fox |
| 2005/0047887 A1 | 3/2005 | Kenny |
| 2005/0133315 A1 | 6/2005 | Hoofard |
| 2007/0050999 A1 | 3/2007 | Milner et al. |
| 2008/0124203 A1 | 5/2008 | McDonald |
| 2008/0314693 A1 | 12/2008 | Van Aspert |
| 2009/0169298 A1 | 7/2009 | Lane |
| 2011/0226565 A1 * | 9/2011 | Jette ................ B60T 3/00 188/32 |
| 2011/0272101 A1 | 11/2011 | Schilling et al. |
| 2013/0037356 A1 * | 2/2013 | Andersen ............ B60T 3/00 188/32 |
| 2015/0027818 A1 | 1/2015 | Bellota |
| 2019/0329994 A1 | 10/2019 | Ion |
| 2020/0216276 A1 | 7/2020 | Palmer et al. |
| 2020/0354176 A1 | 11/2020 | Valentin |
| 2021/0031736 A1 | 2/2021 | Perozzo |
| 2021/0170997 A1 | 6/2021 | Widgery |
| 2021/0316974 A1 | 10/2021 | Leum et al. |

FOREIGN PATENT DOCUMENTS

| | | |
|---|---|---|
| CN | 203111202 U | 8/2013 |
| DE | 609179 A | 2/1935 |
| DE | 633272 A | 7/1936 |
| DE | 3126788 C2 | 4/1988 |
| DE | 19516219 A1 | 11/1996 |
| DE | 19706326 C1 | 10/1998 |
| EP | 0025399 B1 | 3/1983 |
| EP | 0128992 A1 | 12/1984 |
| EP | 0284532 A1 | 9/1988 |
| EP | 0384850 B1 | 11/1994 |
| EP | 0631088 A1 | 12/1994 |
| EP | 0537075 B1 | 4/1995 |
| EP | 0496727 B1 | 9/1996 |
| EP | 0639488 B1 | 3/1997 |
| EP | 0836579 B1 | 2/1999 |
| EP | 0942095 A1 | 9/1999 |
| EP | 0744327 B1 | 11/1999 |
| EP | 1095880 A1 | 5/2001 |
| EP | 1167253 B1 | 4/2004 |
| EP | 1764275 B1 | 4/2009 |
| EP | 2236445 B1 | 4/2011 |
| EP | 2292481 B1 | 5/2013 |
| EP | 2089302 B1 | 11/2013 |
| EP | 2380833 B1 | 9/2014 |
| EP | 2796395 A1 | 10/2014 |
| EP | 2307237 B1 | 1/2016 |
| EP | 2832669 B1 | 4/2016 |
| EP | 2851320 B1 | 11/2016 |
| EP | 2930130 B1 | 9/2017 |
| EP | 3159229 B1 | 6/2018 |
| EP | 3401251 A1 | 11/2018 |
| EP | 3210892 B1 | 1/2019 |
| EP | 3028966 B1 | 3/2019 |
| EP | 3613685 B1 | 7/2021 |
| FR | 2652340 B1 | 1/1992 |
| FR | 2689845 B1 | 8/1996 |
| FR | 2750123 B1 | 8/1998 |
| FR | 2832113 B1 | 3/2004 |
| FR | 2873351 A1 | 1/2006 |
| FR | 2869578 B1 | 6/2006 |
| FR | 2982225 B1 | 12/2013 |
| FR | 3035387 B1 | 5/2017 |
| FR | 3039528 B1 | 9/2017 |
| FR | 3055008 B1 | 8/2018 |

(56) References Cited

FOREIGN PATENT DOCUMENTS

| | | | |
|---|---|---|---|
| FR | 3095811 | A1 | 11/2020 |
| GB | 774550 | A | 5/1957 |
| GB | 779681 | A | 7/1957 |
| GB | 2290590 | B | 4/1998 |
| GB | 2410482 | B | 1/2007 |
| GB | 2528380 | B | 5/2021 |
| WO | 9749625 | A1 | 12/1997 |
| WO | 2008098742 | A1 | 8/2008 |
| WO | 2010029181 | A1 | 3/2010 |
| WO | 2020093178 | A1 | 5/2020 |
| WO | 2020221887 | A1 | 11/2020 |
| WO | 2021073952 | A1 | 4/2021 |
| WO | 2022016265 | A1 | 1/2022 |

OTHER PUBLICATIONS

Machine translation in English of CN203111202.
Machine translation in English of DE19706326.
Machine translation in English of EP0284532.
Machine translation in English of EP0639488.
Machine translation in English of EP1764275.
Machine translation in English of EP2851320.
Machine translation in English of EP2930130.
Machine translation in English of EP3159229.
Machine translation in English of EP3401251.
Machine translation in English of FR2689845.
Machine translation in English of FR2750123.
Machine translation in English of FR3035387.
Machine translation in English of FR3039528.
Machine translation in English of FR3055008.
Machine translation in English of FR3095811.
Machine translation in English of WO2020221887.
Machine translation in English of CA2164737.
Machine translation in English of CA2164738.
Machine translation in English of DE609179.
Machine translation in English of DE633272.
Machine translation in English of EP0025399.
Machine translation in English of EP0128992.
Machine translation in English of EP0384850.
Machine translation in English of EP0496727.
Machine translation in English of EP0537075.
Machine translation in English of EP0836579.
Machine translation in English of EP2089302.
Machine translation in English of EP2236445.
Machine translation in English of EP2292481.
Machine translation in English of EP2307237.
Machine translation in English of EP2380833.
Machine translation in English of EP2832669.
Machine translation in English of FR2652340.
Machine translation in English of FR2869578.
Machine translation in English of FR2873351.
Machine translation in English of FR2982225.
Machine translation in English of WO9749625.
Machine translation in English of WO200898742.
Machine translation in English of WO201029181.
Machine translation in English of DE3126788.
Machine translation in English of DE19516219.
Machine translation in English of EP0631088.

* cited by examiner

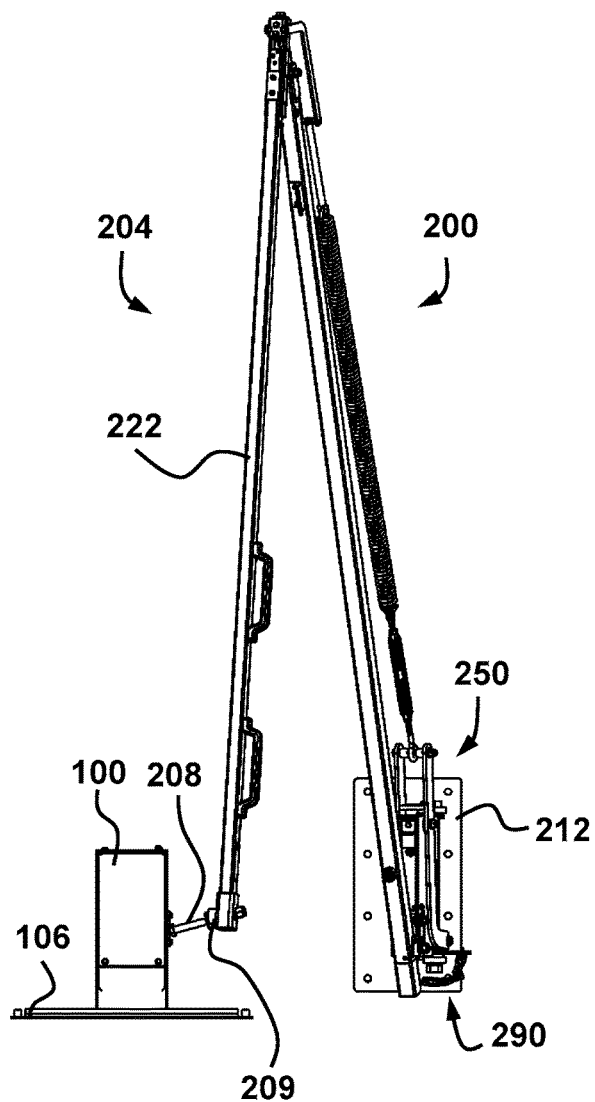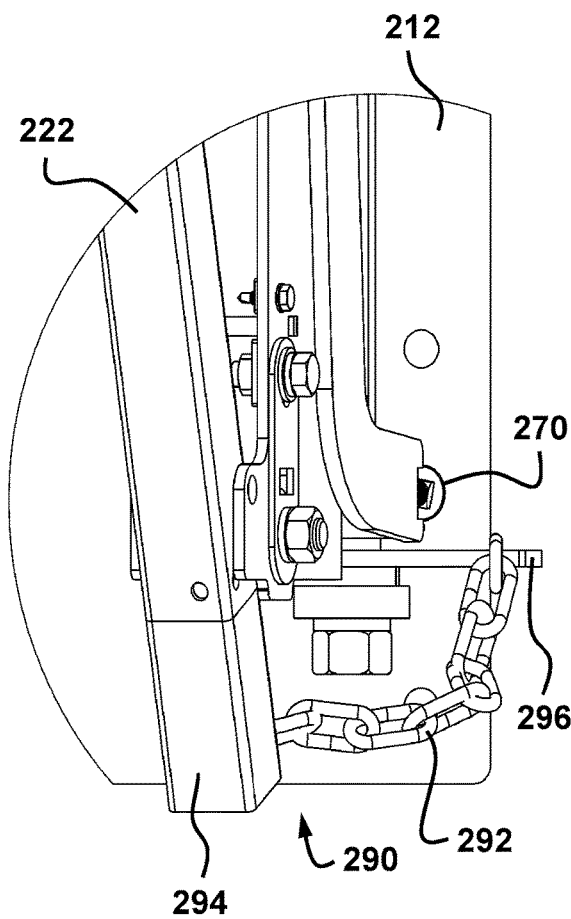
FIG. 33
FIG. 34

WHEEL CHOCK HANDLING UNIT AND METHOD

CROSS REFERENCE TO PRIOR APPLICATIONS

The present case is a continuation of PCT Application No. PCT/CA2019/051607 filed on 12 Nov. 2019. PCT/CA2019/051607 claims the benefits of U.S. patent application No. 62/758,305 filed 9 Nov. 2018. The entire contents of these prior patent applications are hereby incorporated by reference.

TECHNICAL FIELD

The technical field relates generally to the handling of wheel chocks used for preventing vehicles from moving away in an unauthorized or accidental manner when they are parked, for instance at a loading area, at a loading dock, in a parking lot, or in any other suitable kinds of driveways or locations.

BACKGROUND

Wheels chocks are devices that can be positioned immediately in front of a wheel of a parked vehicle to act as an obstacle in the event of an unauthorized or accidental departure. This event can happen as a result, for instance, of an error or because someone is trying to steal the vehicle. Many other situations exist, including ones where the vehicle movements are caused by other factors, such as trailer creep where motion of a lift truck entering and exiting a trailer can cause separation between the trailer and the dock leveler. Other situations are possible as well.

Various wheel chock arrangements have been suggested over the years. Examples can be found, for instance, in U.S. patent application publication No. 2016/0272168 A1 published 22 Sep. 2016 and in U.S. patent application publication No. 2018/0086320 A1 published 29 Mar. 2018. The entire contents of these patent applications are hereby incorporated by reference. The underside of the wheel chocks can include a plurality of teeth engaging corresponding teeth or other kinds of blocking elements provided on a ground-anchored base plate on which the wheel chocks are set to create an obstacle for vehicles in a departure direction. Other kinds of wheel chocks, arrangements and configurations exist as well.

U.S. Pat. Ser. Nos. 7,032,720 and 7,264,092, as well as U.S. patent application publication No. 2016/0272168 A1, include examples of articulated spring-assisted devices for use with wheel chocks. Such devices counterbalance at least part of the weight of the corresponding wheel chock connected at their free end, thereby helping an operator in positioning the wheel chock by hand on the base plate. The operator may be, for instance, the driver of the vehicle or someone working at the site. The wheel chock is initially at a storage position and out of the way of incoming vehicles.

Because a location such as a loading dock may receive vehicles of different sizes and wheel layouts, the distance over which the wheel chock must be transported from its storage position may vary. For instance, a wheel chock may be installed at about 1.2 meters (4 feet) for one vehicle and the same wheel chock could be installed at about 4.2 meters (14 feet) for another. Other distances are possible.

When the vehicle is authorized to depart, some operators often simply move the wheel chock to the side of the base plate and omit or forget to bring the wheel chock back to the storage position, for instance against or close to the wall at the bottom of the loading area. It is thus often desirable that an articulated spring-assisted device be provided to bring back the wheel chock automatically towards the storage position over the entire range of operation. However, this goal is usually complicated by the fact that the wheel chock generally rests on the ground when simply moved to the side of the base plate. The articulated spring-assisted device should then generate a pulling force sufficient to overcome the friction of the wheel chock on the ground, even at the maximum extended position, to bring it back to the storage position. On the other hand, an excessive spring force can cause the wheel chock to arrive too fast at its storage position, among other things. An excessive spring force can also make the wheel chock harder to move by hand and may tend to lift a portion of the wheel chock when set at some positions along the base plate.

While existing articulated spring-assisted devices have been useful for the handling of wheel chocks, they required some compromises during their design and/or installation, and this often leads to a number of challenges. Some articulated spring-assisted devices proposed in the past were difficult to adjust and were not always performing optimally over some parts of their range or under certain conditions, among other things. In general, solving one problem often results in a new one being created.

Overall, there is still room for further improvements in this area of technology.

SUMMARY

In one aspect, there is provided a wheel chock handling unit for use with a wheel chock, the wheel chock handling unit including: a base; an articulated cantilever arm assembly having opposite first and second ends, the first end being pivotally mounted to the base for angular displacement of the arm assembly in a substantially vertical plane between a storage position and an extended position, the second end of the arm assembly receiving the wheel chock; a main spring assembly extending between the arm assembly and the base; and a force-compensation mechanism including: a lever having at least an elongated leading section interposed between the main spring assembly and the base, the leading section having opposite first and second ends, the first end of the leading section being pivotally mounted to the base for angular displacement of the lever in a plane that is substantially parallel to that of the arm assembly, the main spring assembly being pivotally mounted to the lever at or about the second end of the leading section.

In another aspect, there is provided a wheel chock handling unit as described, shown and/or suggested herein.

In another aspect, there is provided a wheel chock restraint system as described, shown and/or suggested herein.

In another aspect, there is provided a method of handling a wheel chock as described, shown and/or suggested herein.

More details on the various aspects, features and advantages of the proposed concept can be found in the following detailed description and the appended figures.

BRIEF DESCRIPTION OF THE FIGURES

FIG. 33 is a front view showing the wheel chock handling unit in FIG. 31.

FIG. 34 is an enlarged front view of parts at the base of the wheel chock handling unit in FIG. 33.

DETAILED DESCRIPTION

Figure 1:
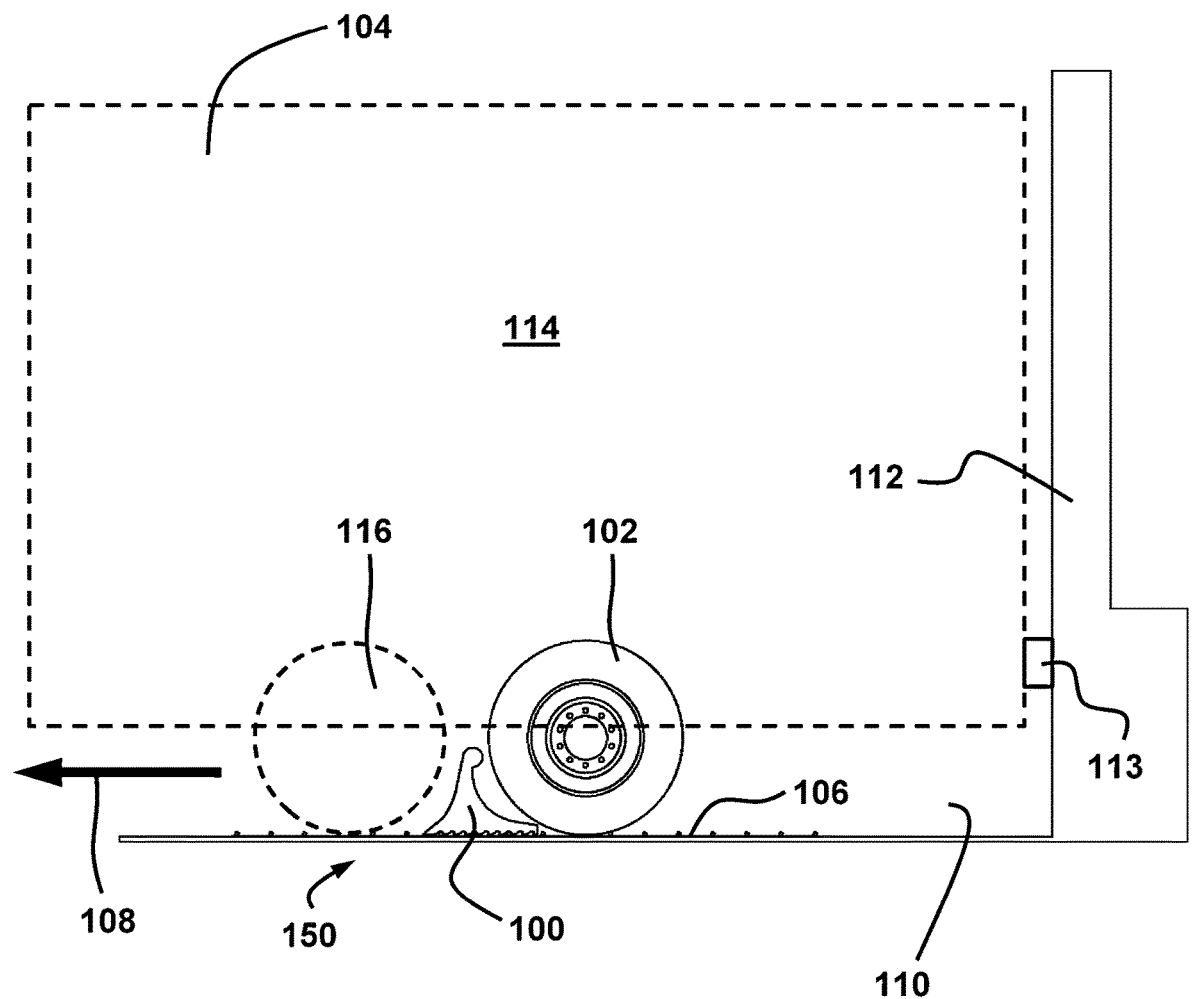
FIG. 1 is a semi-schematic side view showing an example of a wheel chock located in front of a wheel of a generic vehicle.

FIG. 1 is a semi-schematic side view showing an example of a wheel chock 100 located in front of a wheel 102 of a generic vehicle 104, in this case a truck trailer designed to be hauled by a truck tractor. This is only one among a multitude of possible uses for the wheel chock 100.

The wheel chock 100 is provided for preventing the vehicle 104 from moving away in an unauthorized or accidental manner. The wheel chock 100 is designed to be positioned directly in front of the wheel 102 over a ground-anchored base plate 106. The wheel chock 100 and the base plate 106 are part of a wheel chock restraint system 150. The wheel chock 100 is in a tire-blocking position in FIG. 1 and prevents the vehicle 104 from moving in a direction of departure. This direction of departure corresponds to the longitudinal axis 108 in the illustrated example. It should be noted that the departure direction may not always be the forward direction for all vehicles since some wheel chocks may need to be positioned behind a wheel instead of being positioned in front of it. The base plate 106 is rigidly anchored to the ground, for instance using bolts or any other suitable arrangement. Other configurations and arrangements are possible as well.

The wheel chock 100 creates an obstacle that must be removed only at the appropriate moment, for instance by the driver of the vehicle 104 and after the vehicle 104 was authorized to leave. The wheel chock 100 is otherwise left in position immediately in front of the wheel 102 to block it, thereby preventing the whole vehicle 104 from moving. In some cases, the wheel chock 100 can be bidirectional and provided to prevent a vehicle from moving in two directions. The wheel chock 100, whether it is bidirectional or not, can also be useful with a vehicle having a swap body configuration. Such vehicle has two basic parts, namely a chassis and a container that can be detached from the chassis. The container has supporting legs to keep it above the ground when detached from the chassis. The wheel chock 100 can be set to prevent the complete vehicle, i.e., the chassis and the container, to leave. It can also be set to prevent the chassis of the vehicle from backing up, in a rearward travel direction, so as to be under the container. Other situations exist as well. For instance, the wheel chock 100 can be used with vehicles that are not truck trailers, including vehicles unrelated to the transport industry.

The vehicle 104 in the example of FIG. 1 is shown as being parked at a loading dock 110 and its rear side is adjacent to the wall 112 located at the end of the loading dock 110. It can rest against a cushion or the like, as shown schematically in FIG. 1 at 113. The wall 112 can be part of a commercial building, for instance a warehouse, a distribution center or the like. Loading docks are not the only locations where wheel chocks can be provided. For instance, wheel chocks can be used with vehicles located in parking areas, truck stops, etc. Other variants are possible as well.

The vehicle 104 illustrated in FIG. 1 includes a cargo compartment 114. Access into the cargo compartment 114 can be made, for instance, using a rear door, which rear door is positioned in registry with a corresponding garage door on the wall 112 when the vehicle 104 is parked at the loading dock 110. The floor inside the cargo compartment 114 and the floor of the corresponding building are often at the same height or at a similar height so that a lift truck or the like can load or unload the cargo therein. A ramp can also be used between both floors if the height difference is too important. Other configurations and arrangements are possible as well.

The wheel chock 100 can include one or more sensors, for instance a sensor to detect the presence of a wheel next to the wheel chock 100 during operation. Different types of sensors can be used, such as non-contact sensors (photocells) or the like. Using mechanical arrangements are possible as well. The sensor or sensors can be linked to one or more systems, for instance security and safety systems. These systems can use signals from sensors to trigger different functions and/or prevent other systems from operating unless the wheel chock 100 is properly placed next to a wheel. Triggered functions can include, for instance, issuing audible and/or visual alarm signals if a sensor does not indicate a proper positioning of the wheel chock 100 and someone attempts to initiate a task that must only be done if the wheel chock 100 is properly positioned. Signals from the sensor or sensors can also be sent to other active security or safety systems, such as interlocks, locking systems, barriers, etc. They may require the use of identification (ID) cards and/or rely on biometric sensors, such as retina, fingerprints or others. Many other variants are possible as well.

In the example illustrated in FIG. 1, the wheel chock 100 is positioned between the wheel 102 and an adjacent wheel 116 located immediately in front of the wheel 102. The wheel 102 and the adjacent wheel 116 can be part of a tandem axle arrangement. Other configurations and arrangements are possible as well.

Many truck trailers have a dual wheel arrangement where two wheels positioned side-by-side at each end of each axle. In this case, the word "wheel" used in the context of the wheel chock 100 refers to the exterior wheel and/or the interior wheel. Most implementations will have the wheel chock 100 in position with only one of the wheels at a time, often the exterior wheel because of its proximity to the side of a vehicle. However, some could position the wheel chock 100 simultaneously in front of the two side-by-side wheels in some situations, or even only in front of the interior wheel in others. It is thus intended that the word "wheel" in a singular form means either only one of the side-by-side wheels or both side-by-side wheels simultaneously in the context of a dual wheel arrangement.

Figure 2:
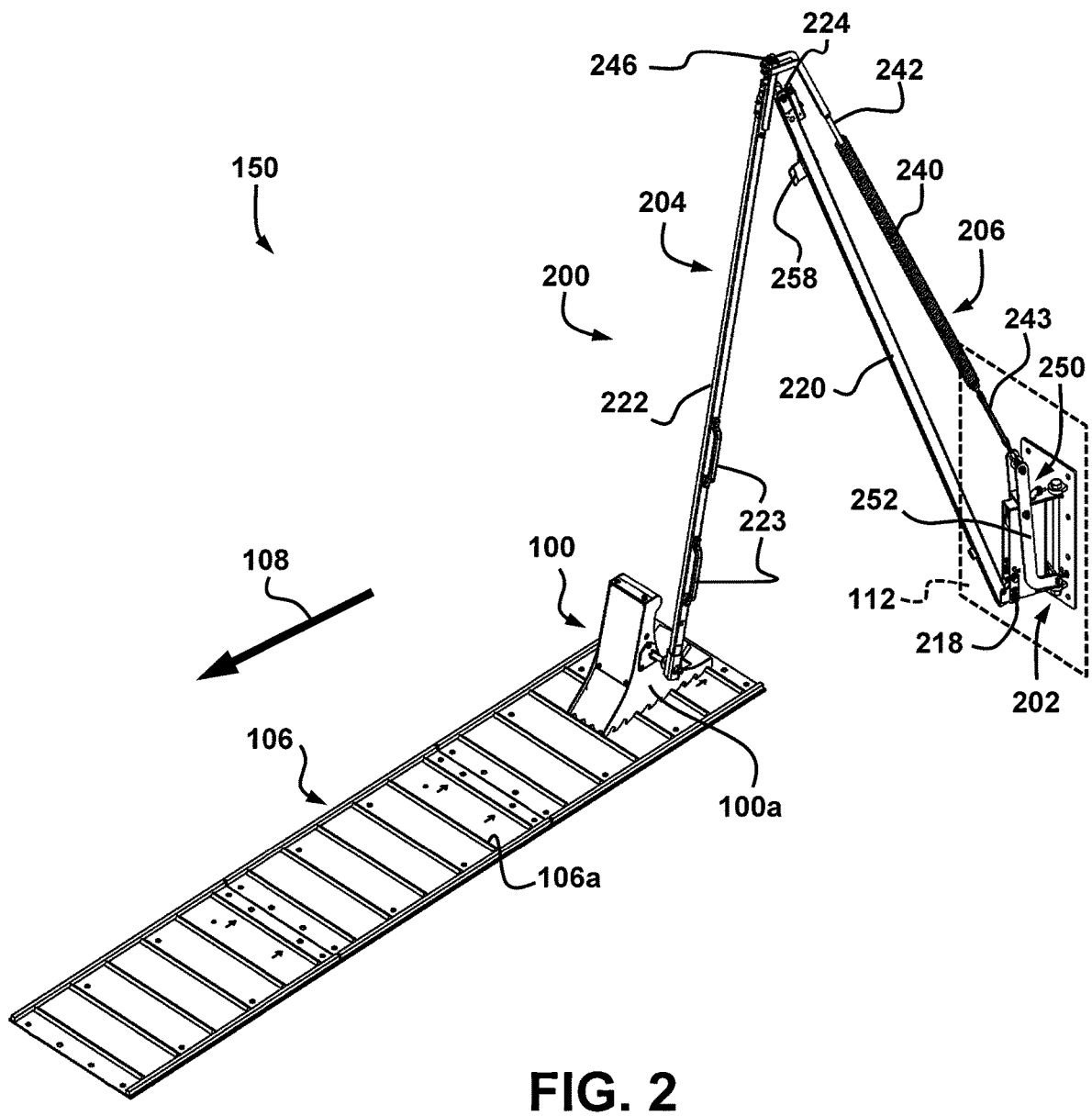
FIG. 2 is an isometric view showing an example of a wheel chock handling unit based on the proposed concept.

FIG. 2 is an isometric view showing an example of a wheel chock handling unit 200 based on the proposed concept. The wheel chock handling unit 200 can be a part of a wheel chock restraint system 150 to help handling the wheel chock 100. The wheel chock 100 can be relatively heavy and the wheel chock handling unit 200 can counterbalance at least part of the weight of the wheel chock 100 to help the operator in positioning the wheel chock 100 at the appropriate location on the base plate 106. Other configurations and arrangements are possible as well. Among other things, the wheel chock handling unit 200 could be considered not to be part of the wheel chock restraint system 150 in some implementations. Other variants are possible as well.

As can be seen in FIG. 2, the base plate 106 in the illustrated example has an elongated shape and extends linearly along the longitudinal axis 108. The base plate 106 of the illustrated example also includes a plurality of stoppers 106a transversally disposed thereon and that are spaced apart from one another along the longitudinal axis 108, for instance regularly spaced individually or in pairs. The stoppers 106a project from above the top surface of a plurality of plates. They are configured and disposed to cooperate with corresponding teeth 100a (FIG. 17) provided underneath the wheel chock 100 so as to create a latching engagement between them when the wheel chock 100 is pushed forcefully in at least one direction. The illustrated base plate 106 allows the wheel chock 100 to be placed at various distances from the wall 112 to accommodate vehicles of different sizes and wheel layouts. Other configurations and arrangements are possible as well. Among other things, the base plate 106 and/or the stoppers 106a could be shaped and constructed differently in other implementations. For instance, each stopper 106a could be in the form of two or more spaced apart segments instead of extending uninterruptedly across the width of the base plate 106 as shown. The base plate 106 could be much shorter in length and even be provided in spaced-apart sections. The base plate 106 may be provided without a peripheral rim or with a rim that is different from the illustrated example. Some implementations could have only one possible position for the wheel chock 100. Still, a base plate could be omitted in some implementations. Other variants are possible as well.

The illustrated wheel chock handling unit 200 includes a base 202, an articulated cantilever arm assembly 204 and a main spring assembly 206.

The base 202 secures the wheel chock handling unit 200 to a fixed location, for instance the wall 112 located at the end of the loading dock 110 (FIG. 1). The base 202 is generally positioned slightly above the ground and can be attached to the wall 112 using different methods. Other configurations and arrangements are possible as well. Among other things, the wall 112 is only one example of a fixed location and it is possible to secure the wheel chock handling unit 200 to another kind of fixed location. For instance, one can use a stand anchored to the ground or attached to any other suitable location. Furthermore, the term "fixed location" includes any suitable structure capable of holding the wheel chock handling unit 200 during operation. A fixed location can include, for instance, a large concrete block resting on the ground. Although the concrete block could possibly be moved using appropriate tools or equipment, it still constitutes a fixed location in the context. Other variants are possible as well. The following description mainly refers the wall 112 for the sake of simplicity. Hence, the term "wall" is only used herein in a generic and non-limitative way.

Figure 3:
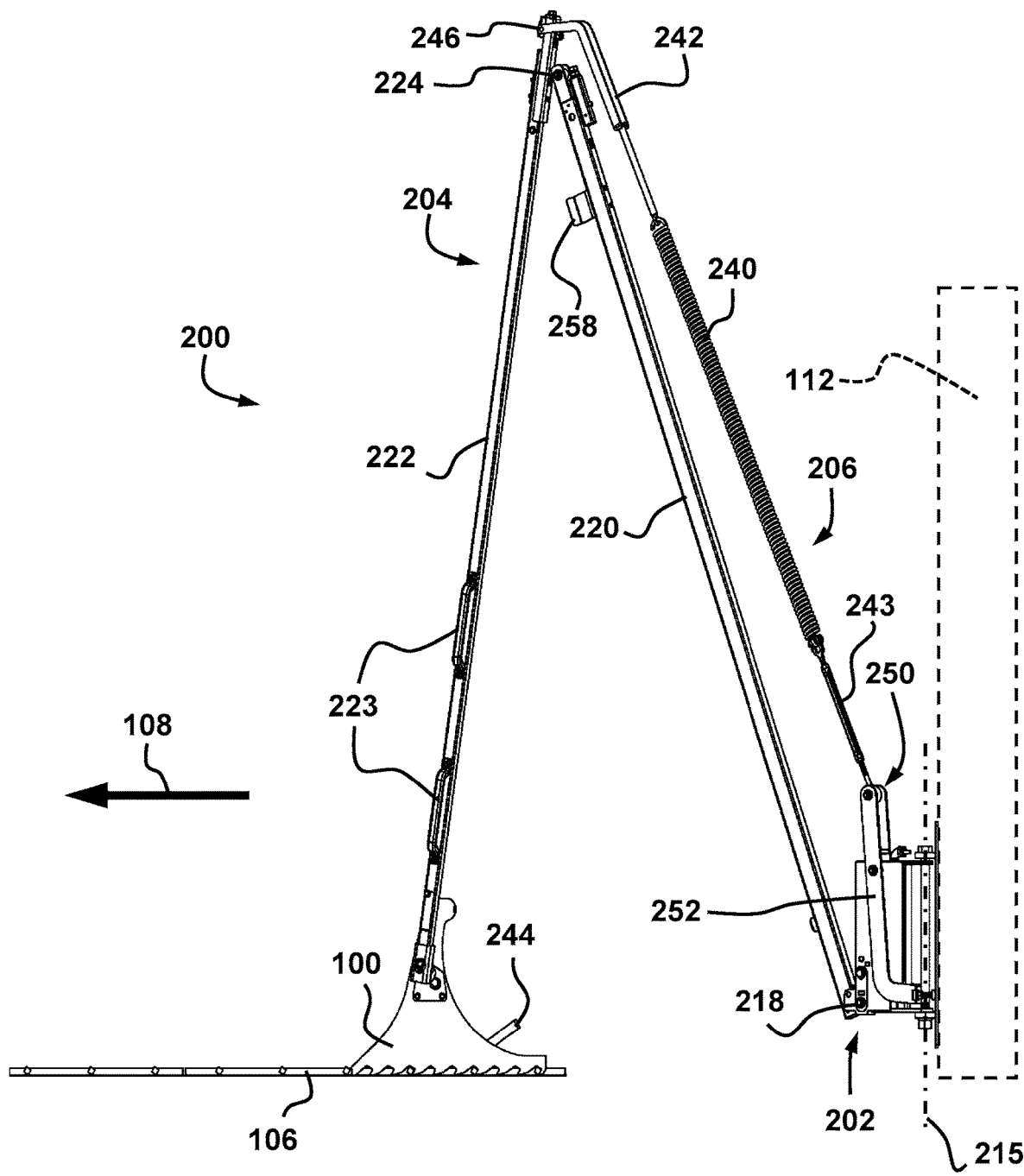
FIG. 3 is a side view showing the wheel chock handling unit in FIG. 2.
Figure 4:
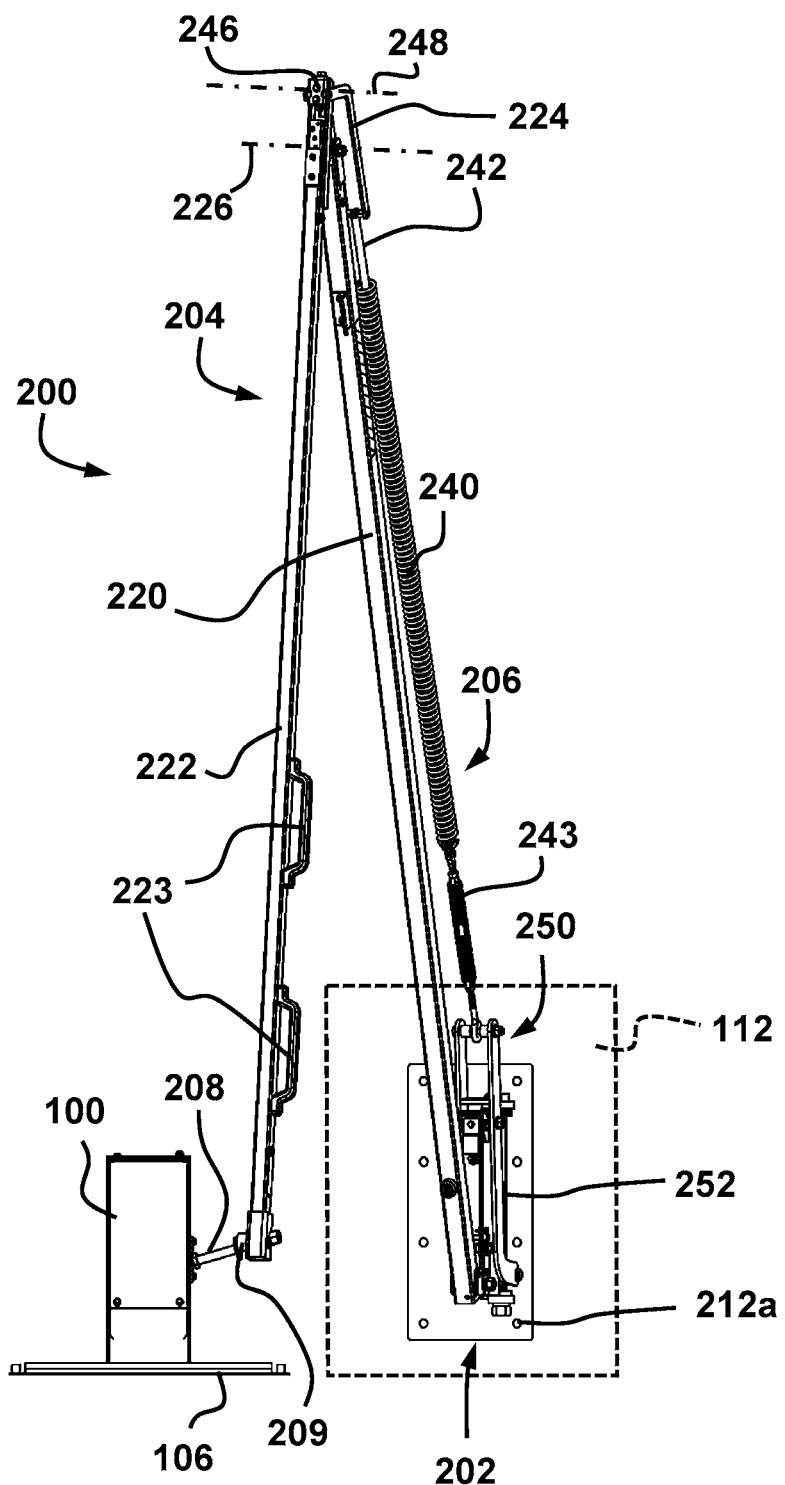
FIG. 4 is a front view showing the wheel chock handling unit in FIG. 2.
Figure 5:
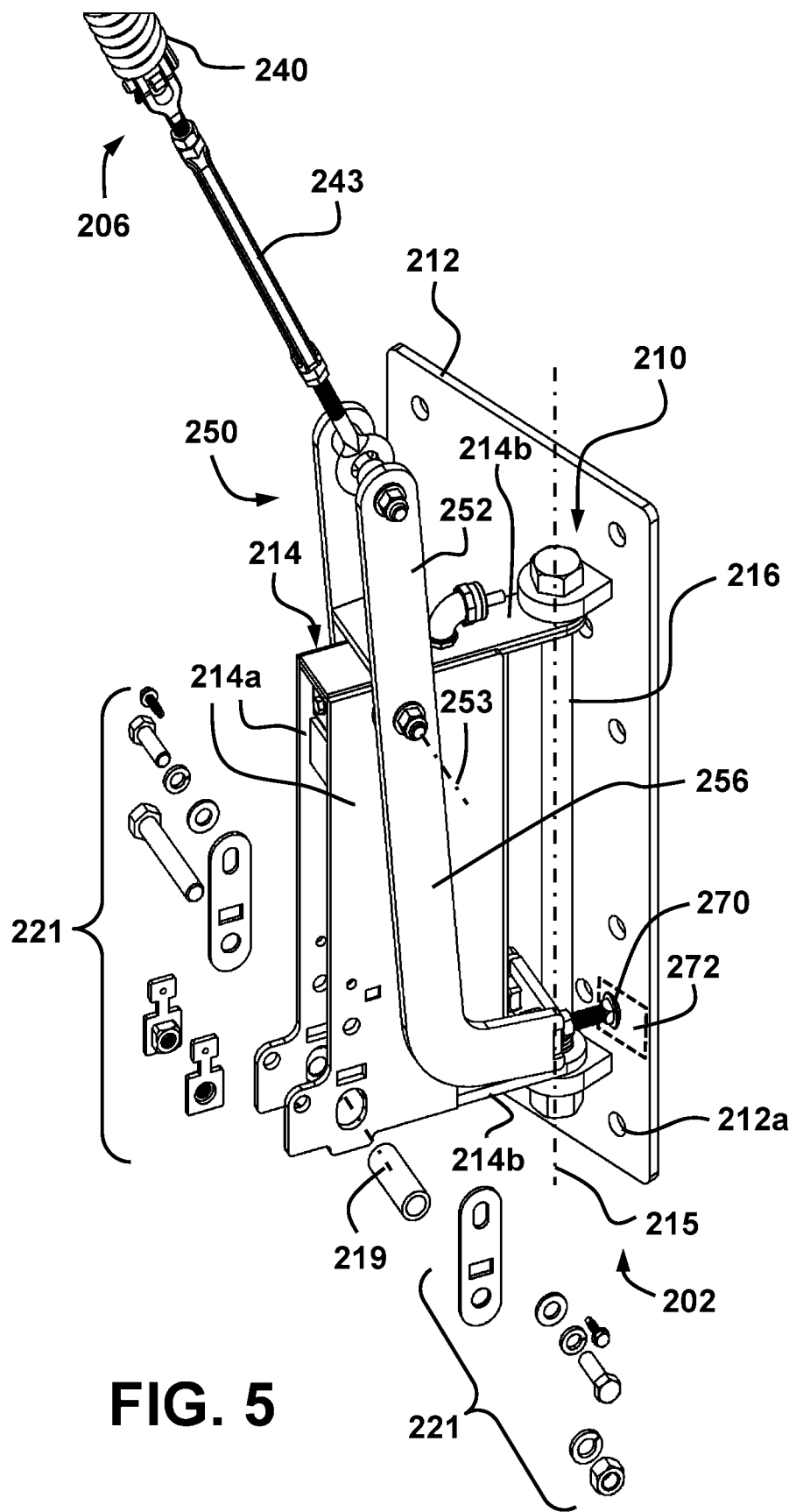
FIG. 5 is an enlarged partially exploded isometric view of some of the parts at the base of the wheel chock handling unit in FIG. 2.

FIGS. 3 and 4 are, respectively, a side view and a front view showing the wheel chock handling unit 200 in FIG. 2. FIG. 5 is an enlarged partially exploded isometric view of some of the parts at the base 202 of the wheel chock handling unit 200 in FIG. 2.

Depending on the implementation, the base 202 can be entirely immovable or can include a movable part as shown in the illustrated example. In the example shown in FIGS. 2 to 5, the base 202 includes a swivel support 210 having a fixed portion 212 and a movable portion 214 that is pivotally mounted to the fixed portion 212 for angular displacement about a substantially vertical pivot axis 215. The fixed portion 212 can be in the form of a large rectangular plate with a plurality of spaced-apart holes 212a provided near its periphery to receive bolts or other kinds of fasteners, as shown. The movable portion 214 can include a rigid structure having two spaced apart and parallel lateral vertical plates 214a that are rigidly attached using top and bottom intermediary members 214b in the illustrated example. The swivel support 210 also includes a vertical axle 216 that is part of a hinge mechanically connecting the fixed portion 212 and the movable portion 214. Other configurations and arrangements are possible as well. Among other things, the base 202, as aforesaid, can be immovable, i.e., static, in some implementations.

The arm assembly 204 has a first end pivotally mounted to the base 202 for angular displacement of the arm assembly 204 in a substantially vertical plane between a retracted storage position and an extended position. In the illustrated example, the first end of the arm assembly 204 is pivotally mounted at the bottom of the movable portion 214 using a bottom joint 218. The first end of the arm assembly 204 pivots about a substantially horizontal pivot axis 219 located at a bottom distal corner of the base 202 in the illustrated example. The bottom joint 218 can include a sleeve 260 (FIG. 26) or the like that is rigidly attached to the side of the proximal arm 220 and a bolt or the like, for instance a bolt with a bushing or a bearing, passes inside the sleeve to pivotally attach the bottom end of the proximal arm 220 to the vertical plates 214a. The bottom front edges of the vertical plates 214a also include a corresponding flanged portion. Other configurations and arrangements are possible. Among other things, the bottom joint 218 can be positioned and constructed differently. Other variants are possible as well.

A height adjustment arrangement 221 is provided in the illustrated example to fine-tune the vertical position of the bottom joint 218. Parts of the height adjustment arrangement 221 can be seen in FIG. 5. The vertical position of each end of the bottom joint 218 can be adjusted by raising or lowering a corresponding one of the side plates. This can be useful, among other things, to align the proximal arm 220 if required. Other configurations and arrangements are possible. This feature can be omitted in some implementations. Other variants are possible.

The distal end of the arm assembly 204 is mechanically connected to the wheel chock 100. This distal end is the free end of the arm assembly 204, thus the end located away from the base 202. The wheel chock 100 can be mechanically connected to the side of the second end using a short rigid linking member 208 or the like, as shown for instance in FIG. 4. One end of the linking member 208 can be rigidly attached to the side of the wheel chock 100, near the top thereof, and the opposite end can be attached to the distal arm 222 using a ball joint 209 or the like. The ball joint 209 can facilitate the final positioning of the wheel chock 100. Other configurations and arrangements are possible as well. Among other things, the wheel chock 100 can be attached differently to the arm assembly 204. The linking member and/or the ball joint can be positioned or constructed differently. One or even both of them can even be omitted in some implementations.

The illustrated arm assembly 204 includes a proximal arm 220 and a distal arm 222 that are pivotally attached at a first upper joint 224. The first upper joint 224 pivots about a substantially horizontal pivot axis 226. The proximal arm 220 has opposite top and bottom ends and the distal arm 222 also has opposite top and bottom ends. The bottom end of the proximal arm 220 corresponds to the first end of the arm assembly 204 and the bottom end of the distal arm 222 corresponds to the second end of the arm assembly 204. Also, in the illustrated example, the proximal arm 220 and the distal arm 222 are each in the form of an elongated single beam member, for instance one having a substantially square or rectangular cross section. They are made of a rigid material, such as a metal, and are rectilinear. The distal arm 222 is slightly smaller in length than the proximal arm 220. Other materials, configurations and arrangements are possible as well. Among other things, the arms 220, 222 can be constructed and/or shaped differently, and may include curves or angles. Other variants are possible as well.

In the illustrated example, the first upper joint 224 is positioned slightly below the top end of the distal arm 222, namely at a first location on the distal arm 222 that is slightly offset from the top end of the distal arm 222. Variants are possible.

The main spring assembly 206 extends generally between the top end of the arm assembly 204 and the top side of the base 202. The main spring assembly 206 is the mechanism that generates the forces to counterbalance at least part of the weight of the wheel chock 100 and to bring the wheel chock back towards the wall 112 when the wheel chock 100 is removed from the base plate 106 once the vehicle is authorized to depart. The main spring assembly 206 urges the arm assembly 204 towards its storage position, namely the position where the wheel chock 100 is brought back towards the wall 112 and where both arms 220, 222 are substantially vertical in the illustrated example.

To move the arm assembly 204 away from the storage position, the operator can grab one of the handles 223 located on the side of the distal arm 222 or the distal arm 222 itself and walk towards the setting point of the wheel chock 100, thereby moving in a general direction that is substantially parallel to the longitudinal axis 108. This will extend the arm assembly 204 and change the elongation of the main spring assembly 206. Extending the main spring assembly 206 increases the return force it generates. The wheel chock 100 is often entirely above the ground when the arm assembly 204 is moved by hand by the operator but this is not the only possible method and, among other things, the wheel chock 100 can partially contact the ground when carried by the operator. Other methods are possible as well. The handles 223 can be positioned differently, and they can even be omitted in some implementations. Other variants are possible as well.

The illustrated main spring assembly 206 has a top end pivotally mounted to the distal arm 222 at a second location within a portion extending from the first location to the top end of the distal arm 222. It is pivotally attached through a second upper joint 246, and it can pivot about a substantially horizontal pivot axis 248. Nevertheless, one can also attach the top end of the main spring assembly 206 to the proximal arm 220 in some implementations. Other configurations and arrangements are possible as well.

In the illustrated example, the main spring assembly 206 includes a single extension spring 240, for instance a helical spring. Other configurations and arrangements are possible as well. For instance, some implementations can include two or more springs provided side-by-side. Other kinds of springs can be used.

The extension spring 240 is shorter than the overall length of the main spring assembly 206 in the illustrated example and the main spring assembly 206 includes a top connector member 242. The top end of the extension spring 240 is pivotally attached to the bottom end of the top connector member 242, and the top end of the top connector member 242 is pivotally attached to the second upper joint 246. The bottom end of the extension spring 240 in the illustrated example is pivotally attached to a bottom connector member 243, for instance using an eyelet through a transversal bolt or axle. This bottom connector member 243 includes a turnbuckle in the illustrated example to fine-tune the tension from the extension spring 240. Other configurations and arrangements are possible. For instance, the top connector member 242 and/or the bottom connector member 243 can be omitted in some implementations. The turnbuckle could be provided on the top connector member 242 or even be omitted in some implementations. Other kinds of pivot connectors are possible. Other variants are possible as well.

In the illustrated example, the top connector member 242 is substantially L-shaped near its top end and is substantially U-shaped in cross section at least near to top end to prevent it from interfering with the proximal arm 220 and the distal arm 222 when the arm assembly 204 is at or near the storage position. Variants are possible as well. For instance, the top connector member 242 can include two side portions that are positioned on the sides of the arm assembly 204 when it is at or near the storage position. Other configurations and arrangements are possible as well.

A resilient spacer 244 is provided on the wheel chock 100 of the illustrated example, as shown in FIG. 3. This spacer 244 can be made of rubber or of another suitable material. It is positioned and disposed to keep the wheel chock 100 slightly away from a wheel so as to mitigate the risks of having the wheel chock 100 becoming stuck under the wheel due to the weight of the vehicle increasing as it is loaded. Other configurations and arrangements are possible. Among other things, the spacer 244 can be omitted in some implementations. Other variants are possible as well.

A resilient bumper 245 (FIG. 5) can be provided on the bottom front side of the proximal arm 220 of the illustrated example, as shown. This bumper 245 can be useful for preventing a direct contact between the corresponding main surfaces of the two arms 220, 222 at the storage position. It can also absorb shocks when the arm assembly 204 gets to the storage position. Other configurations and arrangements are possible. Among other things, the resilient bumper 245 can be positioned or constructed differently. It can also be omitted in some implementations. Other variants are possible as well.

The wheel chock handling unit 200 further includes a force-compensation mechanism 250. This force-compensation mechanism 250 includes a lever 252 that is pivotally mounted to the base 202 for angular displacement in a plane that is substantially parallel to that of the arm assembly 204. In the illustrated example, the lever 252 is pivotally mounted to the movable portion 214 of the swivel support 210 and pivots about a substantially horizontal pivot axis 253. The lever 252 can also be provided on a base 202 that is immovable. Other configurations and arrangements are possible.

A bracket 258 is attached to the proximal arm 220. This bracket 258 projects from one edge of the proximal arm 220 towards the distal arm 222, more precisely from the edge that is opposite to the side from which the wheel chock 100 extends. Because the arm assembly 204 generally supports at least some of the weight of the wheel chock 100, if not the entire weight thereof, when it is in the storage position, the bracket 258 helps keep the two arms 220, 222 in alignment. Other configurations and arrangements are possible. Among other things, the bracket could be omitted in some implementations. Other variants are possible as well.

Figure 6:
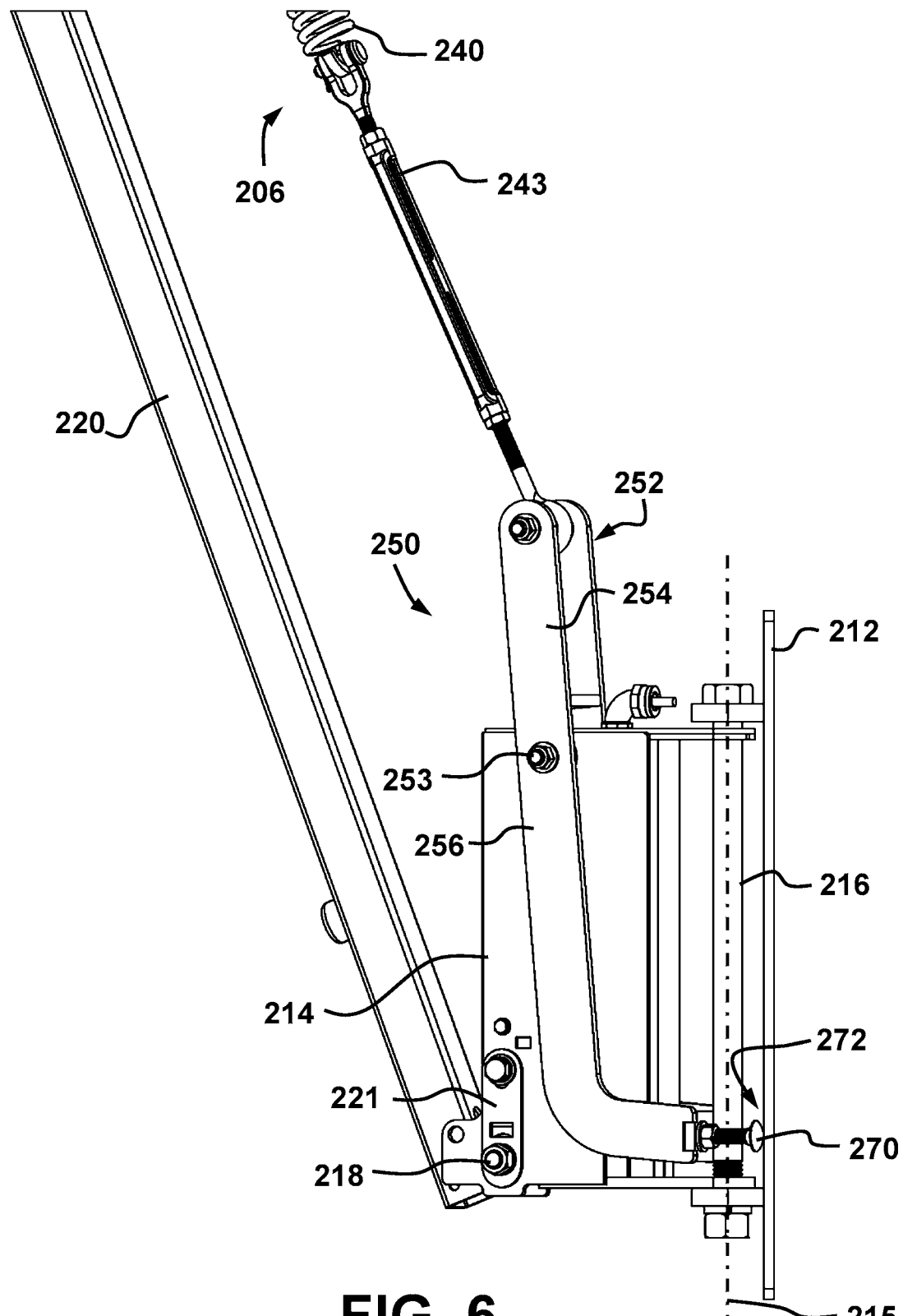
FIG. 6 is an enlarged side view of the parts at the base of the wheel chock handling unit in FIG. 2.

FIG. 6 is an enlarged side view of the parts at the base 202 of the wheel chock handling unit 200 in FIG. 2

The force-compensation mechanism 250 of the wheel chock handling unit 200 can be implemented in different ways. In the example shown for instance in FIGS. 2 to 6, the lever 252 includes an elongated leading section 254 interposed between the bottom of the main spring assembly 206 and the base 202. This leading section 254 has opposite first and second ends. The first end of the leading section 254 is pivotally mounted to the base 202. The bottom of the main spring assembly 206 is pivotally mounted to the lever 252 at or about the second end of the leading section 254, thus located away from the first end. The second end of the leading section 254 is vertically higher than the top edge of the base 202. Other configurations and arrangements are possible. Among other things, the bottom end of the main spring assembly 206 does not necessarily need to be at the top extremity of the lever 252. The second end of the leading section 254 can be a location that is more or less distant from the top end of the lever 252. One can also provide multiple possible positions for receiving the bottom end of the main spring assembly 206, each at a slightly different height, for obtaining the settings. Each of these positions, in the context, would still fit within the meaning of the second end. Other variants are possible as well.

The lever 252 in the illustrated example includes an elongated trailing section 256 in addition to the leading section 254. The trailing section 256 has opposite first and second ends, the first end being located next to the first end of the leading section 254. The trailing section 256 includes an upper portion and a bottom portion. In the illustrated example, the leading section 254 and an upper portion of the trailing section 256 are in registry with one another. They are also made integral with one another. Other configurations and arrangements are possible.

Still, in the illustrated example, the bottom portion of the trailing section 256 is substantially L-shaped near the bottom, thus near the second end of the trailing section 256. This second end is oriented towards the wall 112 and it corresponds to the bottommost end of the lever 252. Other configurations and arrangements are possible as well.

The force-compensation mechanism 250 shown in FIGS. 2 to 6 includes a follower 270 mounted to the lever 252 at the second end of the trailing section 256 or close to it. The follower 270 projecting towards a contact surface 272 located on the fixed portion 212 of the swivel support 210. Alternatively, the contact surface 272 can be located adjacent to the fixed portion 212 or be provided on both the fixed portion 212 and an adjacent location. The contact surface 272 is the area that can be engaged by the free end of the follower 270. The contact surface 272 can be machined or not. It can be, as illustrated, simply the outer flat surface of the fixed portion 212. Variants are possible.

The follower 270 of the illustrated example includes a threaded bolt having a head portion and a threaded shank. The threaded shank is mounted into a corresponding threaded element, for instance a nut secured to the lever 252, or into a corresponding threaded hole provided at the bottom end of the lever 252. The head portion of the bolt has a smooth hemispheric outer surface, and the follower 270 engages the contact surface 272 through this outer surface. The follower 270 is adjustable in length to fine-tune the settings. Other configurations and arrangements are possible. For instance, the follower 270 could be made non-adjustable in some implementations. The follower 270 can also be formed, in some implementations, directly by the free end at the bottom of the lever 252 engaging the contact surface 272.

The base 202 of the wheel chock handling unit 200 in the illustrated example includes a swivel support 210 and the follower 270 is only located on either a left side or a right side of the swivel support 210, namely on the side opposite to that of the base plate 106. The follower 270 engages the contact surface 272 at least when the arm assembly 204 is out of the storage position to press on the contact surface 272. Then, pivoting the arm assembly 204 will also change the position of the follower 270 on the contact surface 272. Some implementations can be configured or set so that the follower 270 remains engaged with the contact surface 272 at the storage position. Other configurations and arrangements are possible.

The lever 252 can be double sided, as shown in the illustrated example. One side is located on the right side of the swivel support 210 and the other side is located on the left side of the swivel support 210. This double-sided lever 252 includes a first transversal member extending between the two sides of the lever 252 and to which the main spring assembly 206 is attached, a second transversal member extending between the two sides and through which the lever 252 is pivotally attached to the base 202, and a third transversal member extending between the bottom ends of the two sides. Other configurations and arrangements are possible.

The lever 252 of the force-compensation mechanism 250 shown in FIGS. 2 to 6 is designed to pivot, when the arm assembly 204 is at or close to the storage position, so as to disengage the follower 270 from the contact surface 272. This can be implemented in different ways. One is to have a lever 252 where the trailing section 256 at the bottom is made heavier than the leading section 254 at the top. Gravity will tend to pivot the lever 252 when the spring force from the main spring assembly 206 becomes relatively low. The direction of the force is another factor and the lever 252 can be forced to pivot, even if the spring force remains relatively high, if the spring force vector moves in front of the pivot point of the lever 252. Other configurations and arrangements are possible as well. Among other things, one could use a return spring for specifically pivoting the lever 252 when the arm assembly 204 is at or close to the storage position. The trailing section 256 could a length equal or shorter than that of the leading section 254. Other variants are possible as well.

As can be appreciated, the follower 270 of the illustrated example, among other things, helps keep the proper orientation of the arm assembly 204 and, in use, can mitigate or even prevent the spring force from moving the wheel chock 100 sideways, particularly when there are small back-and-forth motions of the wheel 102, for instance when moving cargo inside the vehicle. These small movements, combined with the spring force, tend to bring the wheel chock 100 to the side. However, because the follower 270 pushes on the fixed portion 212 at a location on the bottom side of the vertical axle 216, which side is opposite to the one where the wheel chock 100 is located, the arms 220, 222 can be maintained in the proper orientation. The follower 270 would be placed on the other side if the wheel chock 100 is provided on the other side at the end of the distal arm 222.

Figure 7:
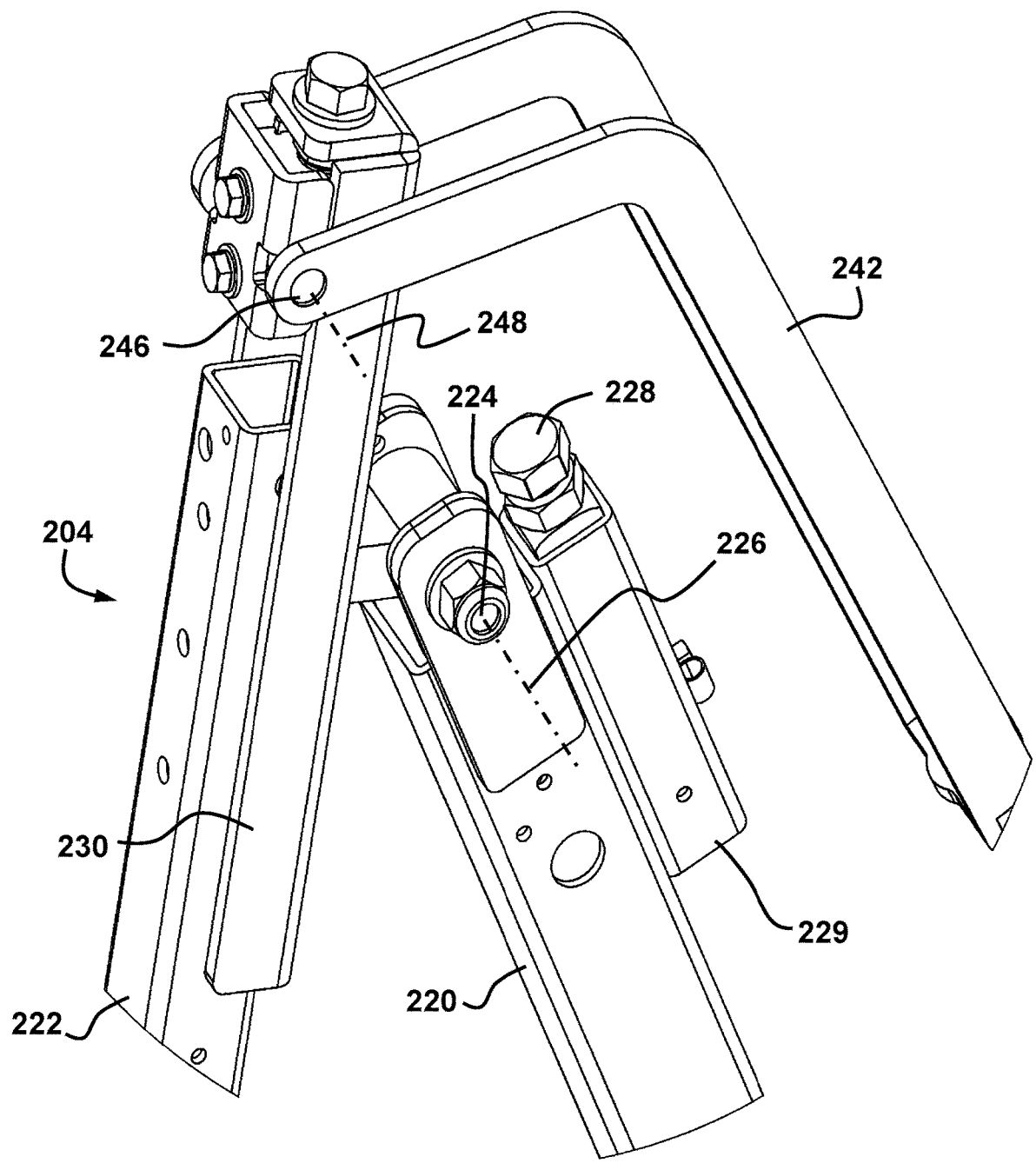
FIG. 7 is an enlarged isometric view of parts at the top end of the wheel chock handling unit in FIG. 2.

FIG. 7 is an enlarged isometric view of parts at the top end of the wheel chock handling unit 200 in FIG. 2. FIG. 7 shows, among other things, an adjustable stopper 228 to limit the relative angle between the proximal arm 220 and the distal arm 222 when the arm assembly 204 is at the fully extended position. The illustrated example shows that the stopper 228 includes a bolt that is generally parallel to the proximal arm 220 and that is threaded in a holding member 229 attached over the proximal arm 220. The parts are configured and disposed so that the top end of the distal arm 222 engages the head of the bolt of the stopper 228 at the fully extended position. Changing the position of the bolt of the stopper 228 allows increasing or decreasing this maximum distance between the wheel chock 100 and the wall 112. Other configurations and arrangements are possible. Among other things, the stopper 228 can be constructed differently and/or positioned elsewhere. It may not necessarily adjustable in all implementations and may also be omitted in others. Other variants are possible as well.

FIG. 7 also shows an example of a mechanical arrangement 230 for adjusting the position of the second upper joint 246. The mechanical arrangement 230 is attached at the top end of the distal arm 222 in FIG. 7 and the first and second upper joints 224, 246 are pivotally connected thereto in the illustrated example. The mechanical arrangement 230 can be bolted or otherwise attached to the distal arm 222 and, in the context, can be considered to be a part of the distal arm 222 itself. Other configurations and arrangements are possible. For instance, one can omit the mechanical arrangement entirely in some implementations or use a completely different method for mounting the upper joints 224, 246. Other variants are possible as well.

Figure 8:
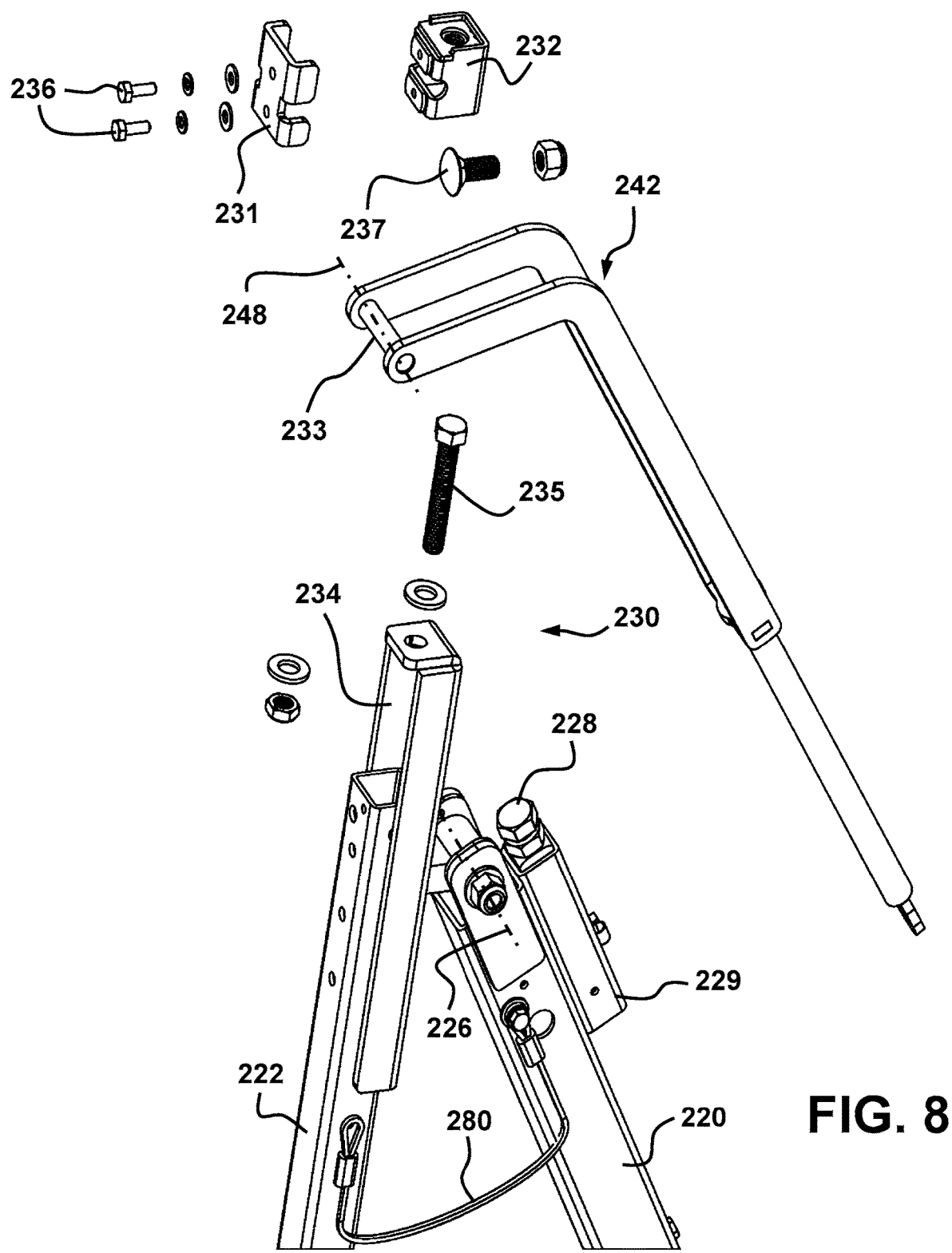
FIG. 8 is a partially exploded isometric view of some of the parts illustrated in FIG. 7.

FIG. 8 is a partially exploded isometric view of some of the parts illustrated in FIG. 7. The illustrated mechanical arrangement 230 includes two opposite complementary members 231, 232 between which a transversal axle 233 extending at the end of the top connector member 242 can be pivotally supported. The bottom member 232 fits into an elongated guide 234 extending at the top end of the distal arm 222. The position of the bottom member 232 within the elongated guide 234 can be changed using a bolt 235. The top member 231 can be attached onto the bottom member 232 using fasteners 236. A guide bolt 237 extends through a corresponding slot made at the bottom of the guide 234. This mechanical arrangement 230 can be useful to fine-tune the wheel chock handling unit 200 from one installation to another. Other configurations and arrangements are possible. For instance, different kinds of adjustment mechanisms can be used instead of the ones being shown. The mechanical arrangement 230 can also be omitted entirely in some implementations. Other variants are possible as well.

As can be seen, the first upper joint 224 includes a sleeve 238 that is rigidly attached to a laterally projecting member 239. The member 239 provides the horizontal spacing for the two arms 220, 222 to be parallel to one another when at the storage position. Other configurations and arrangements are possible.

FIG. 8 shows that the arm assembly 204 can include a safety cable 280 extending between the two arms 220, 222 near their top ends. This cable 280 is provided in the illustrated example in the event someone mishandles the wheel chock 100 and creates an unlikely situation where the wheel chock 100 is grabbed by the vehicle 104 as it departs, thereby causing the two arms 220, 222 to separate. This will prevent the proximal arm 220 from returning forcefully towards the storage position. Generally, if such rupture of the arm assembly 204 occurs, the loud noise associated with the parts breaking is noticed by the driver and vehicle 104 is then immediately stopped. A similar cable can be provided between the wheel chock 100 and the distal arm 222. Other configurations and arrangements are possible. Among other things, the cable 280 can be positioned or constructed differently. It can also be omitted in some implementations. Other variants are possible as well.

Figures 9, 10:
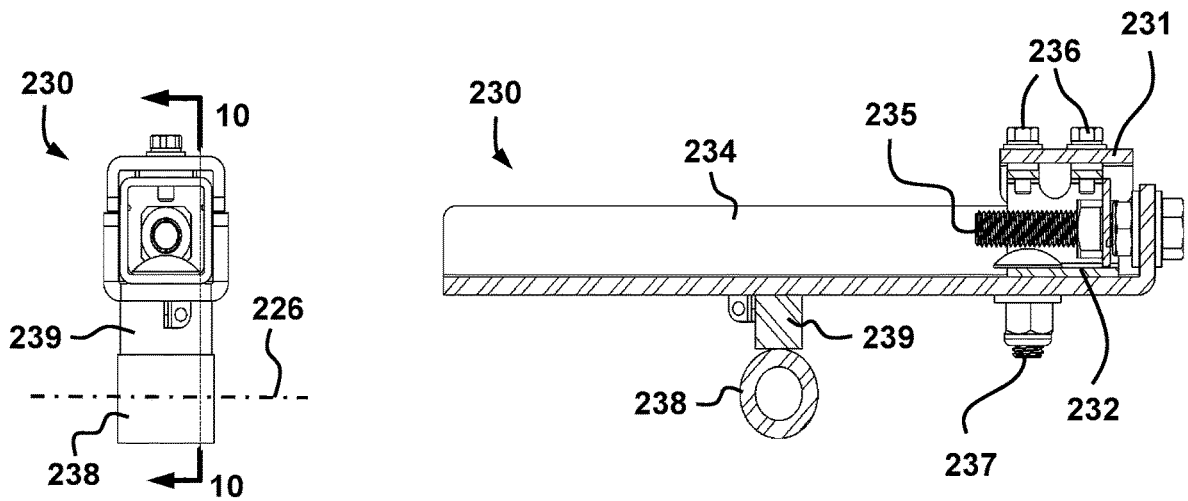
FIG. 9 is an end view of the mechanical arrangement provided at the top end of the distal arm in FIGS. 7 and 8.
FIG. 10 is a longitudinal cross section view of the mechanical arrangement taken along line 10-10 in FIG. 9.

FIG. 9 is an end view of the mechanical arrangement 230 provided at the top end of the distal arm 222 in FIGS. 7 and 8. FIG. 10 is a longitudinal cross section view of the mechanical arrangement 230 taken along line 10-10 in FIG. 9.

Figures 11, 12:
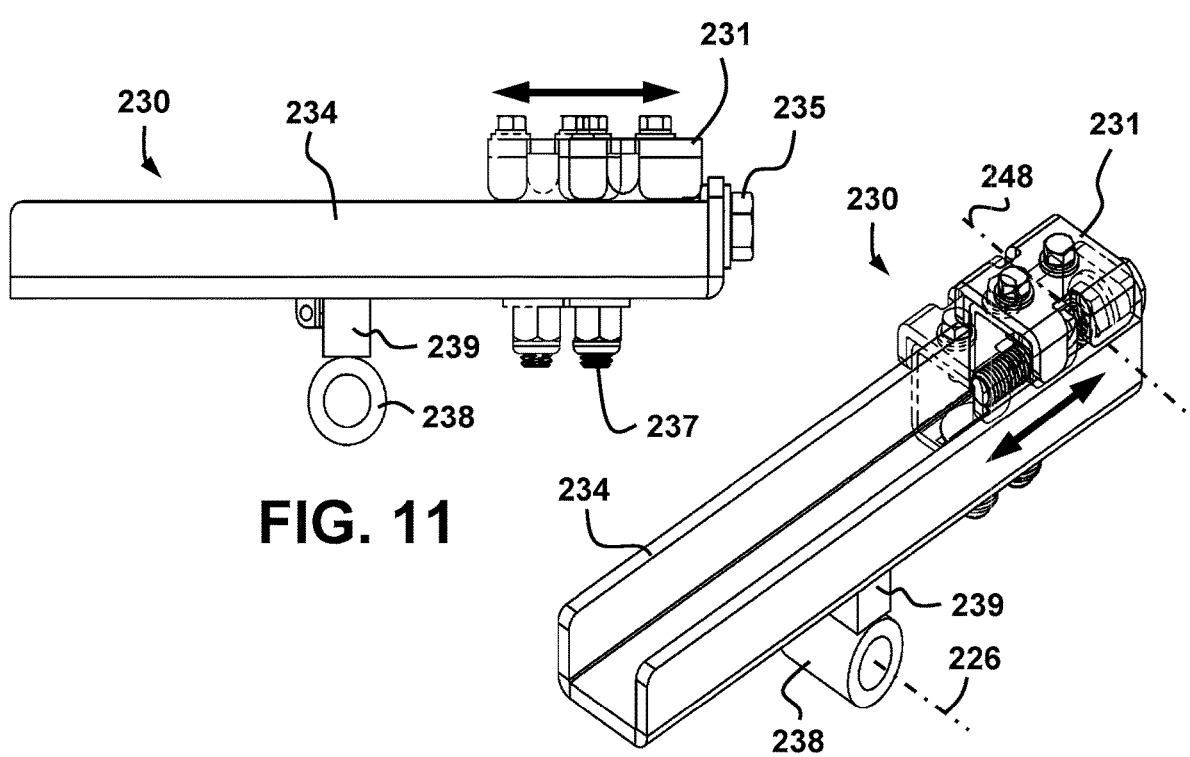
FIG. 11 is a side view of the mechanical arrangement in FIG. 9 and depicts examples of two different setting positions.
FIG. 12 is an isometric view of the mechanical arrangement in FIG. 11.
Figure 13:
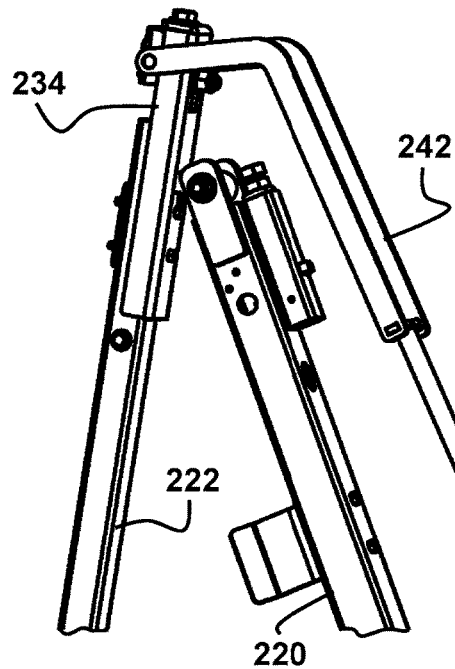
FIGS. 13 and 14 are enlarged isometric views of the parts illustrated in FIG. 7, each corresponding to one of the positions depicted in FIGS. 11 and 12.
Figure 14:
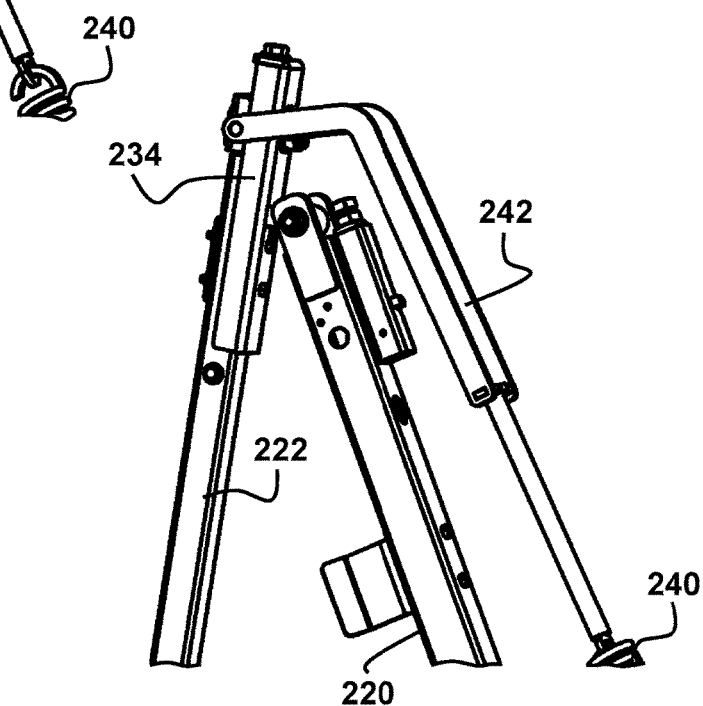

FIG. 11 is a side view of the mechanical arrangement 230 in FIG. 9 and depicts examples of two different setting positions. FIG. 12 is an isometric view of the mechanical arrangement 230 in FIG. 11. FIGS. 13 and 14 are enlarged isometric views of the parts illustrated in FIG. 7, each corresponding to one of the positions depicted in FIGS. 11 and 12.

Figure 15:
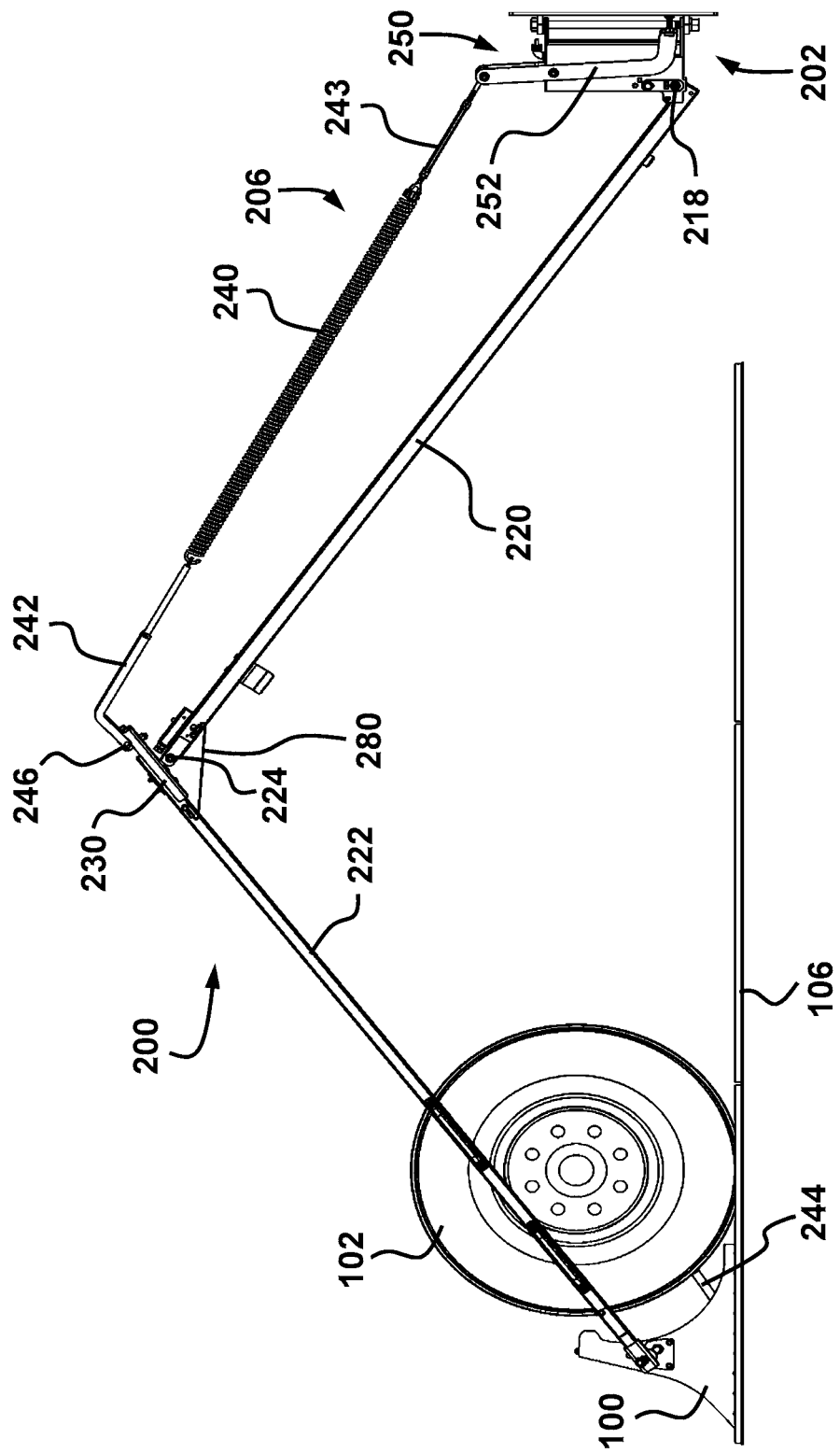
FIG. 15 is a side view showing the wheel chock handling unit in FIG. 2 when further extended and also showing the wheel chock positioned in front of a generic wheel of a vehicle.

FIG. 15 is a side view shows the wheel chock handling unit 200 in FIG. 2 when further extended and also showing the wheel chock 100 positioned in front of a generic wheel 102 of a vehicle. It shows, among other things, the wheel 102 engaging the spacer 244. The cable 280 can also be seen.

Figure 16:
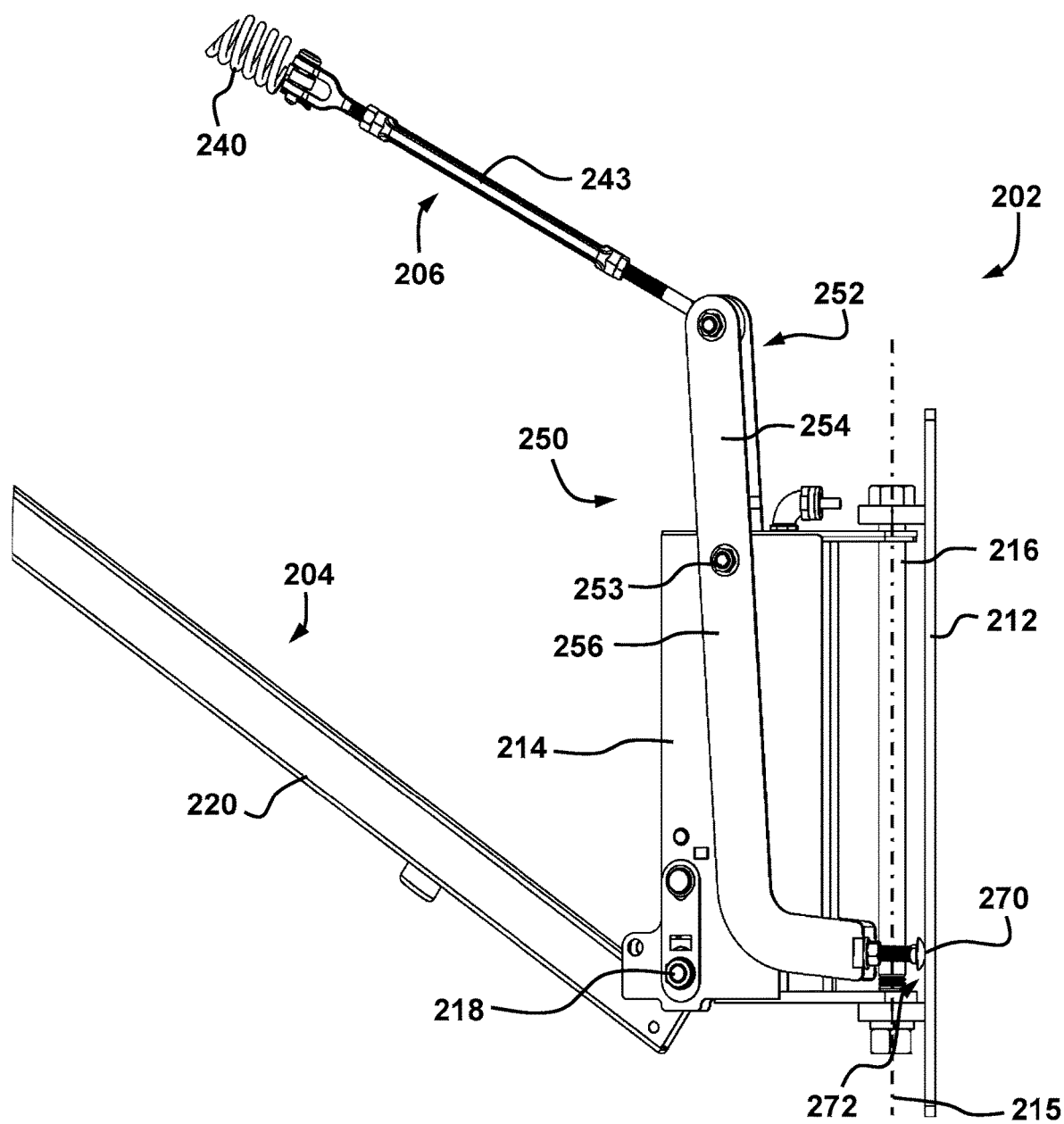
FIG. 16 is an enlarged isometric view showing parts at the base of the wheel chock handling unit in FIG. 10.

FIG. 16 is an enlarged isometric view of parts at the base 202 of the wheel chock handling unit 200 in FIG. 15.

Figure 17:
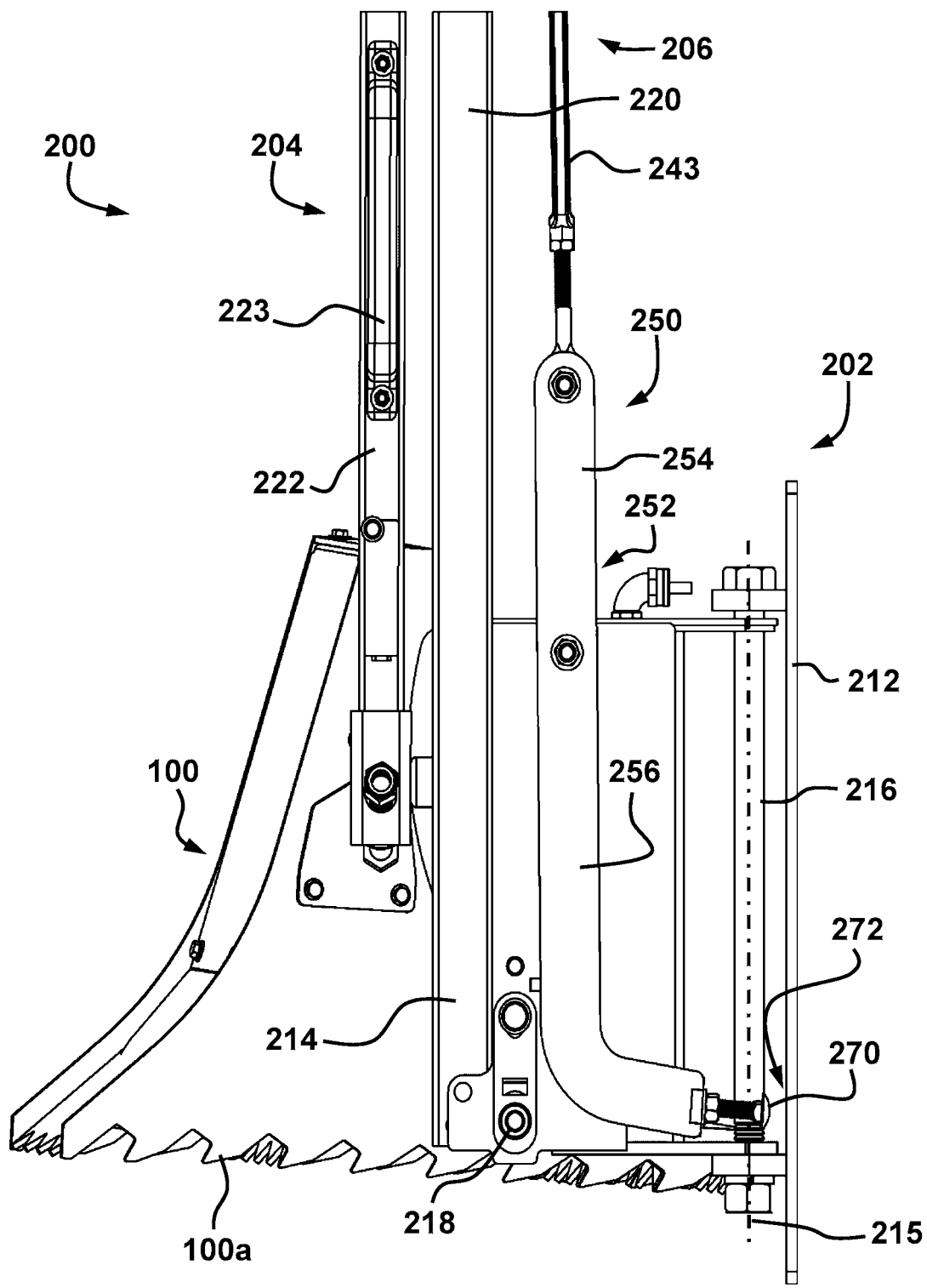
FIG. 17 is an enlarged side view of parts at the base of the wheel chock handling unit in FIG. 2 when set at a storage position.
Figure 18:
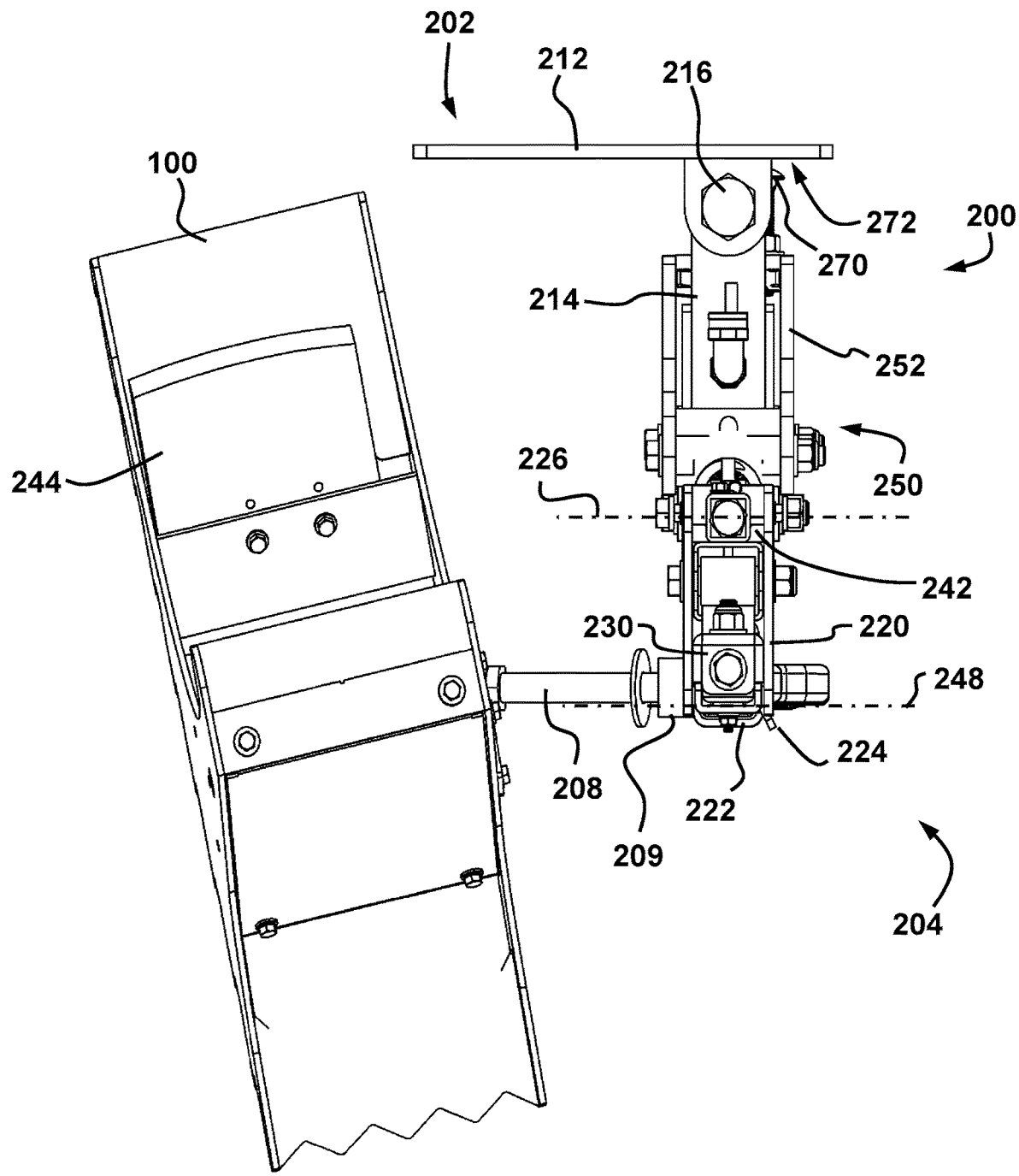
FIG. 18 is a top view of the wheel chock handling unit in FIG. 17.

FIG. 17 is an enlarged side view of parts at the base 202 of the wheel chock handling unit 200 in FIG. 2 when set at a storage position. FIG. 18 is a top view of the wheel chock handling unit 200 in FIG. 12. As can be seen, the follower 270 is now out of engagement with the fixed portion 212.

Figure 19:
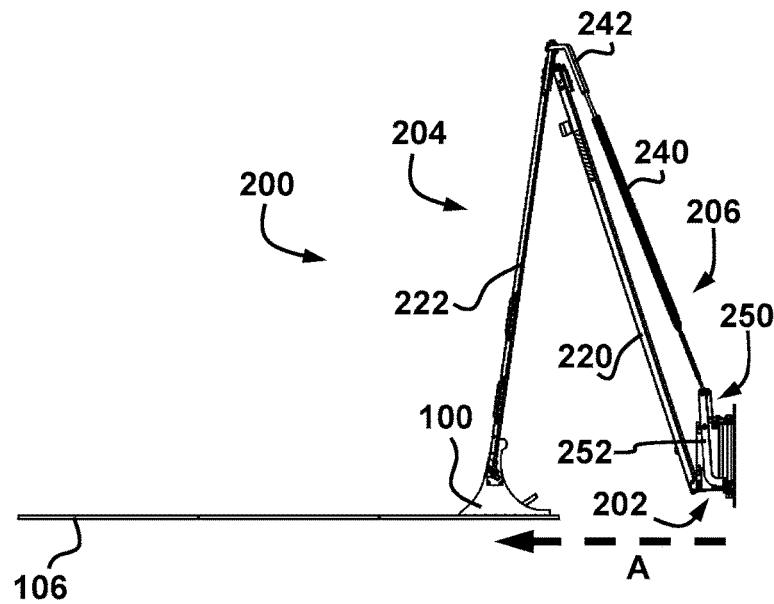
FIGS. 19 to 21 are side views showing the wheel chock handling unit in FIG. 2 at various positions.
Figure 20:
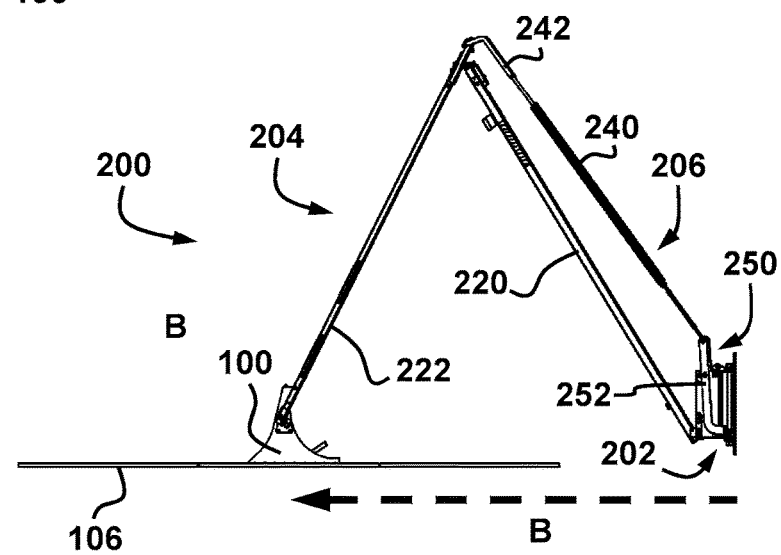
Figure 21:
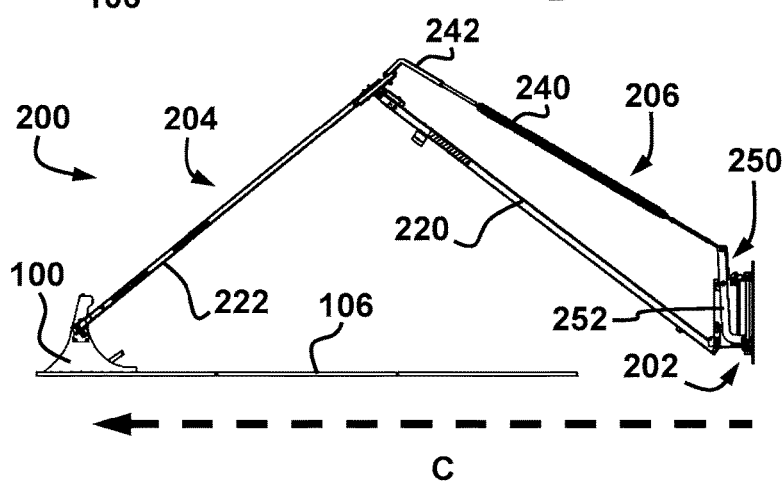

FIGS. 19 to 21 are side views showing the wheel chock handling unit 200 in FIG. 2 at various positions. As can be seen, the wheel chock 100 is set at a proximal position A in FIG. 19. The lever 252 then causes the extension spring 240 to be at a steeper angle than that if the bottom end of the extension spring 240 would simply be attached to the top edge of the base 202. FIG. 20 shows an example when the wheel chock 100 is set at a midway position B. FIG. 21 shows an example when the wheel chock 100 is set at a distal position C, for instance at a position where the arm assembly 204 is fully extended. In FIG. 19, the extension spring 240 is at an angle of about 24 degrees with reference to the vertical. In FIGS. 20 and 21, the angles are 39 degrees and 62 degrees, respectively. Other configurations and arrangements are possible.

When the wheel chock 100 is on the base plate 106 at a relatively short distance from its storage position, the return force exerted by the main spring assembly 206 on the wheel chock 100 has a vertical component that tends to somewhat lift at least a part of it off the base plate 106. It also has a horizontal component that tends to pull the whole wheel chock 100 sideways off the base plate 106, thus in a transversal direction that is perpendicular to the longitudinal axis 108. Moreover, the wheel 102 (FIG. 15) of the vehicle next the wheel chock 100 can transfer some vibrations to it and the wheel can also slightly move back and forth on various occasions. These small repetitive movements can originate from the suspension of the vehicle due to weight variations and/or a lift truck entering and exiting the interior of the vehicle. These factors could bring the wheel chock 100 progressively off the base plate 106, particularly if the wheel chock 100 was not suitably positioned by the operator. The force-compensation mechanism 250 of the first illustrated example counterbalances the horizontal component by directing at least some of the spring force from the main spring assembly 206 to the side of the movable portion 214. This force-compensation mechanism 250 can also automatically reduce the spring force when the wheel chock 100 is moved sideways.

Figures 22, 23:
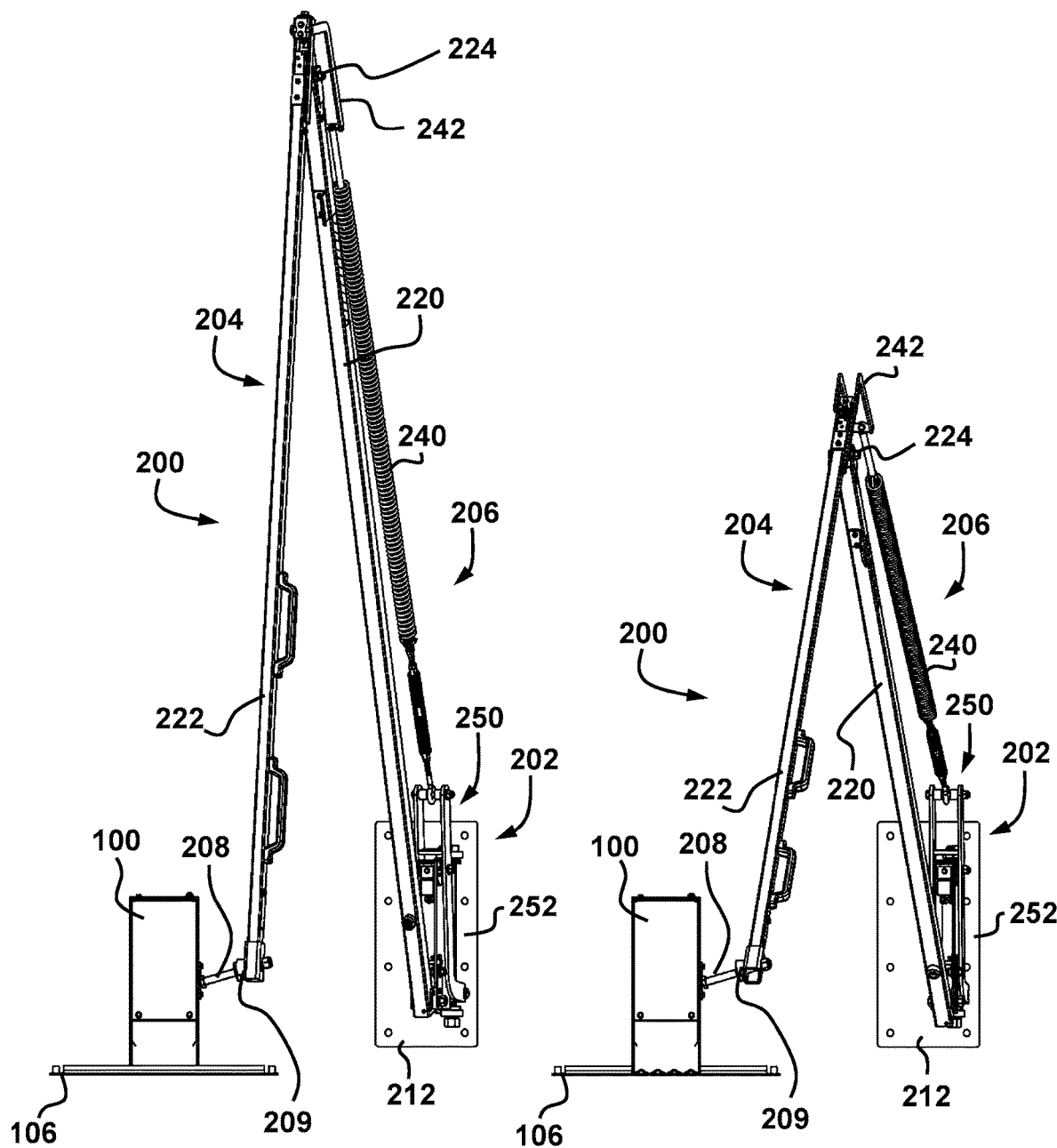
FIGS. 22 and 23 are front views showing the wheel chock handling unit when set in the positions depicted in FIGS. 19 and 21, respectively.

FIGS. 22 and 23 are front views showing the wheel chock handling unit 200 when set in the positions depicted in FIGS. 19 and 21, respectively.

Figures 24, 25:
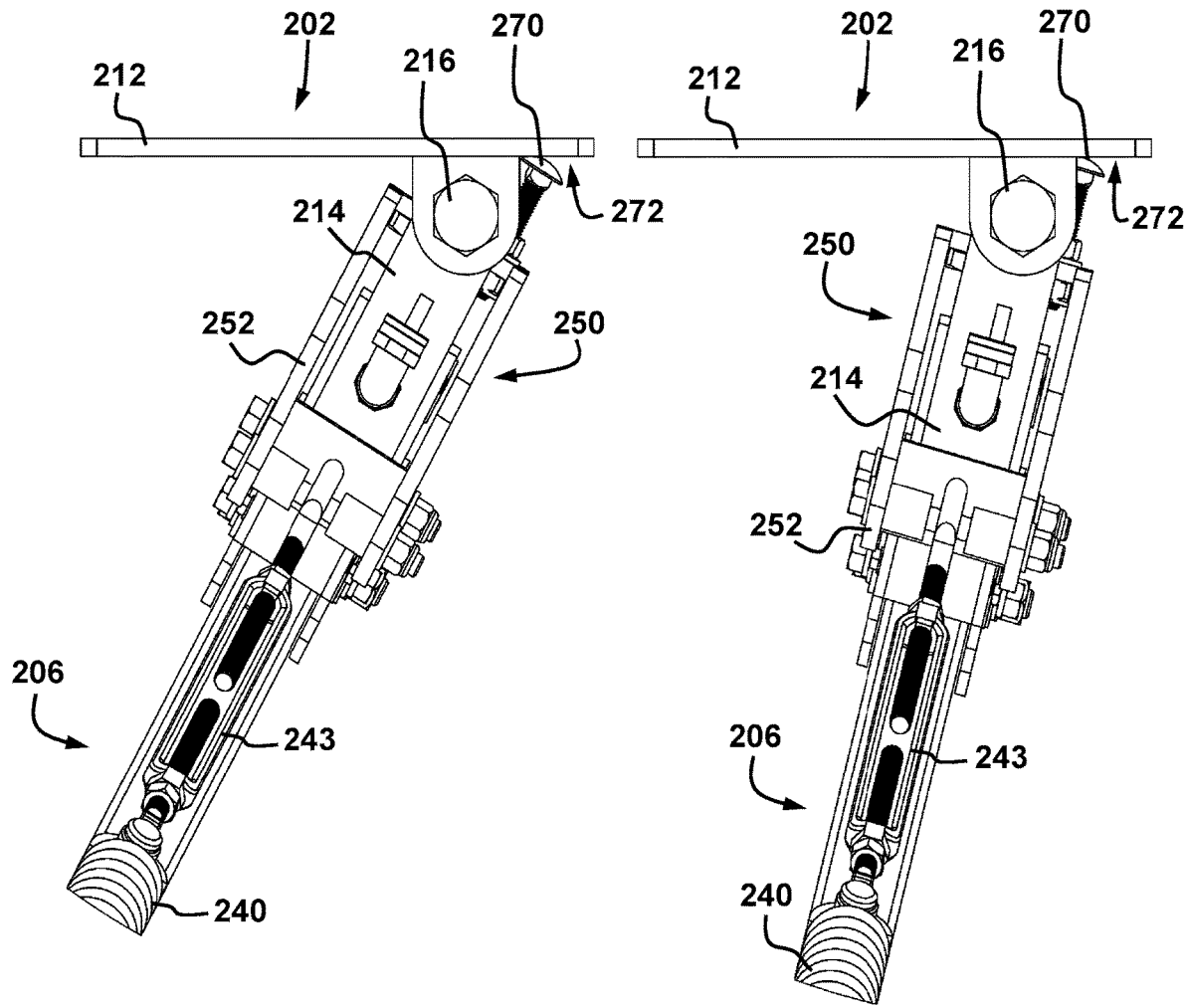
FIGS. 24 and 25 are enlarged top views of parts at the base of the wheel chock handling unit when set in the positions depicted in FIGS. 19 and 21, respectively.

FIGS. 24 and 25 are enlarged top views of parts at the base 202 of the wheel chock handling unit 200 when set in the positions depicted in FIGS. 19 and 21, respectively. FIG. 24 shows the relative angle between the fixed portion 212 and the movable portion 214 when the wheel chock 100 is set at or near the proximal end of the base pate 106. FIG. 25 shows the relative angle between the fixed portion 212 and the and the movable portion 214 when the wheel chock 100 is set at or near the distal end of the base plate 106. As can be seen, the relative angles are not the same.

The follower 270, being located on the side opposite to that of the base plate 106, governs the angle of the lever 252 and because the movable portion 214 pivots about the vertical pivot axis 215, the angle of the lever 252 changes when the movable portion 214 pivots away from a perpendicular position. The second end of the lever 252 is lower in FIG. 24 than in FIG. 25 and lowering the second end decreases the tension in the extension spring 240.

It should be noted that the force-compensation mechanism 250 could be provided as a retrofit kit on an existing articulated spring-assisted device, for instance the ones as suggested in U.S. Pat. Ser. Nos. 7,032,720 and 7,264,092, as well as U.S. patent application publication No. 2016/0272168 A1.

Figure 26:
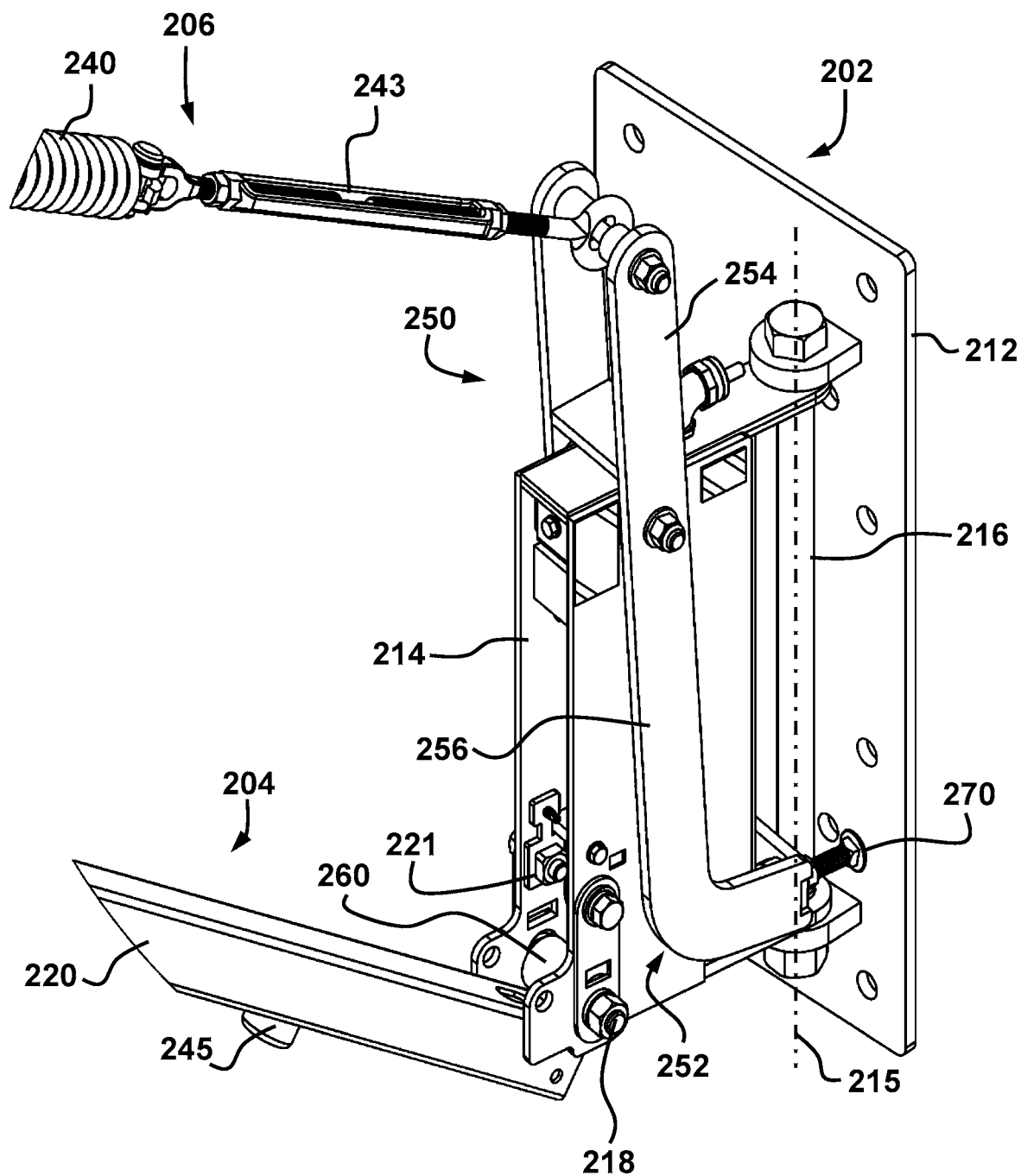
FIG. 26 is an enlarged isometric view of parts at the base of wheel chock handling unit when set at the extended position depicted in FIG. 21.

FIG. 26 is an enlarged isometric view of parts at the base 202 of wheel chock handling unit 200 when set at the extended position depicted in FIG. 21.

Figure 27:
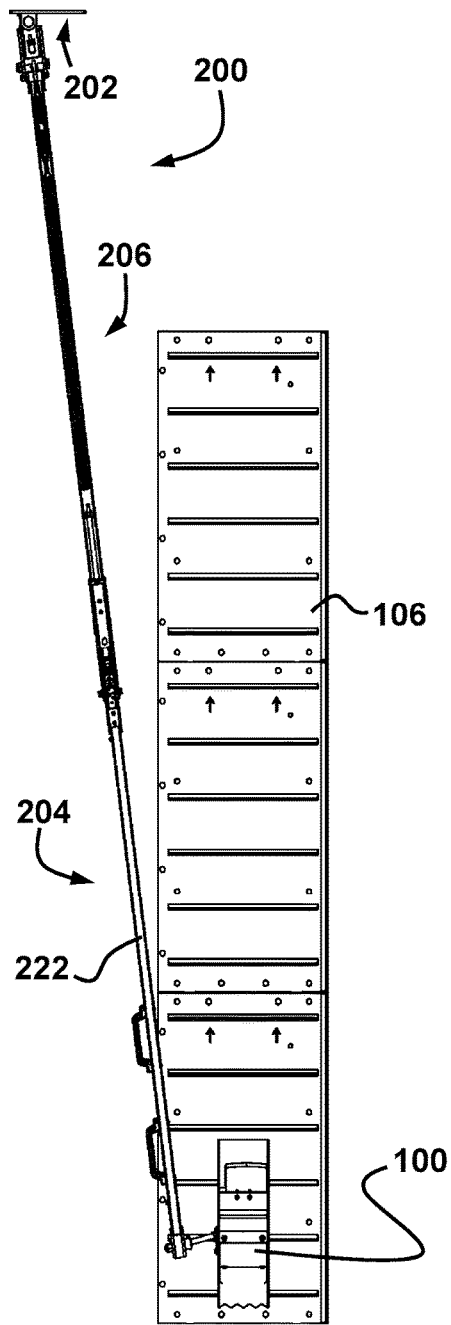
FIG. 27 is a top view showing an example of a left-sided wheel chock handling unit when set at an extended position.
Figure 28:
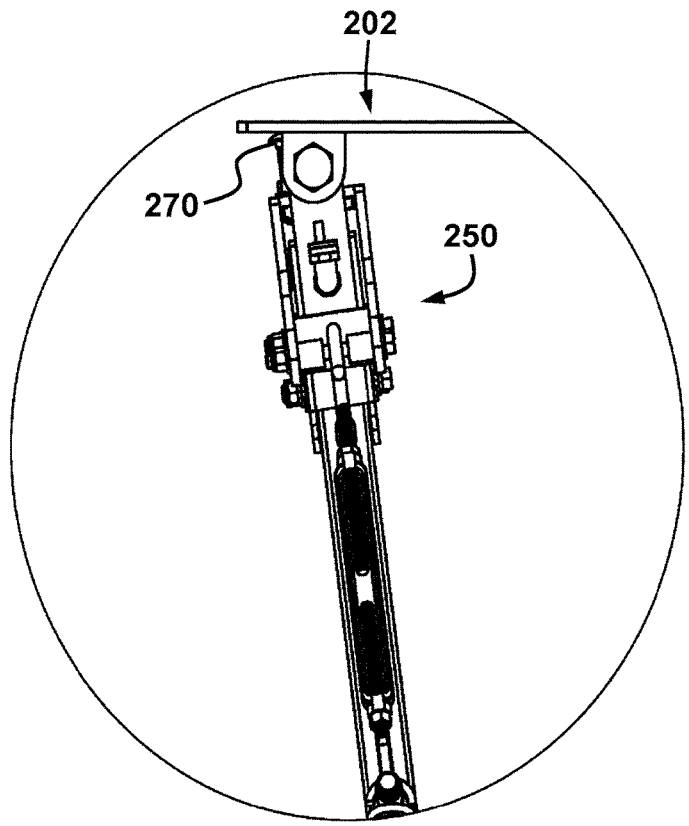
FIG. 28 is an enlarged top view of parts at the base of the wheel chock handling unit in FIG. 27.

FIG. 27 is a top view of an example of a left-sided wheel chock handling unit 200 when set at an extended position. FIG. 28 is an enlarged top view of parts at the base 202 of the wheel chock handling unit 200 in FIG. 27. This implementation is essentially a mirror image of the one shown in FIG. 2.

Figure 29:
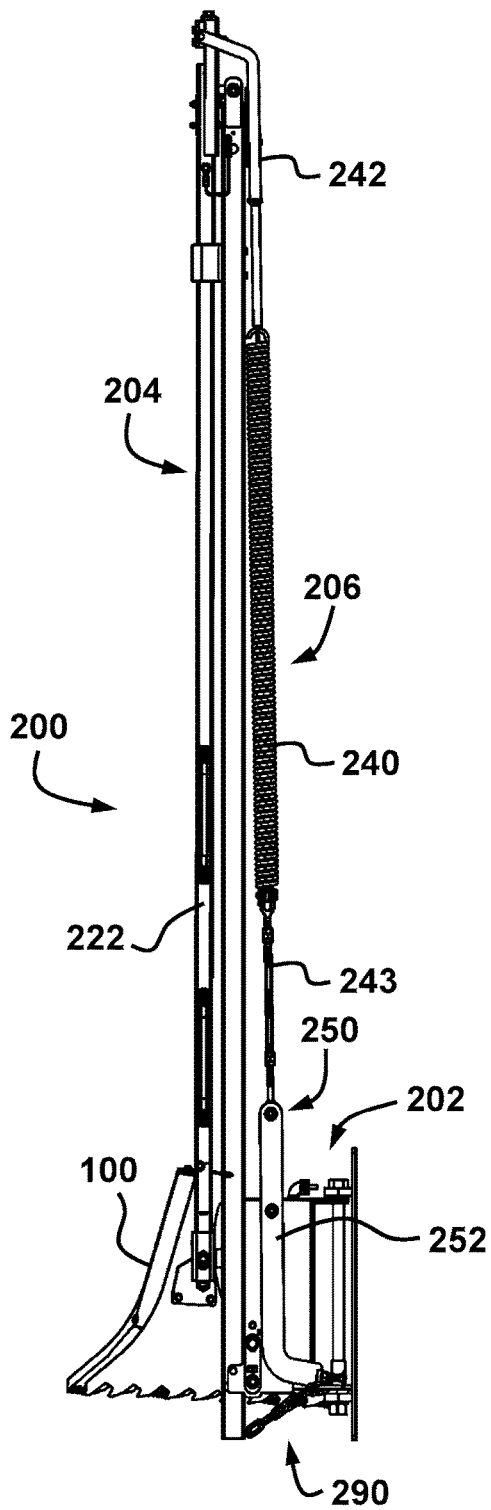
FIG. 29 is a side view showing a wheel chock handling unit similar to that of FIG. 2 but having an additional positioning arrangement at the bottom.
Figure 30:
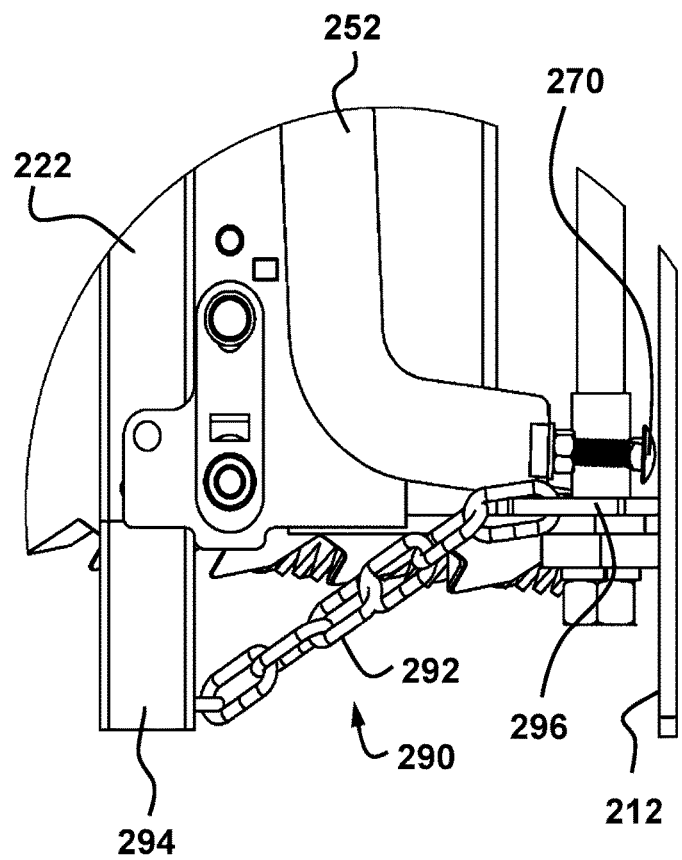
FIG. 30 is an enlarged side view of the parts at the base of the wheel chock handling unit in FIG. 29.

FIG. 29 is a side view showing a wheel chock handling unit 200 similar to that of FIG. 2 but having an additional positioning arrangement 290 at the bottom. FIG. 30 is an enlarged side view of the parts at the base 202 of the wheel chock handling unit 200 in FIG. 29. As can be seen, this positioning arrangement 290 includes a chain 292 extending between a bottom extension 294 of the proximal arm 220 and a flange 296 rigidly attached to the fixed swivel portion 212 in this example. The flange 296 is located on the same side as that of the follower 270. The wheel chock handling unit 200 is in a storage position in FIGS. 29 and 30, and the chain 292 is under tension to prevent the base 202 from pivoting towards the vehicle. This can prevent, for instance, the wheel chock handling unit 200 from becoming stuck or damaged by the rear end of a vehicle because the vehicle is very large and/or it is not properly aligned with the loading dock and the arm assembly 204 was pivoted towards the vehicle, notwithstanding the presence of strong guarding elements or protectors secured to the wall 112. The positioning arrangement 290 can also be used to mitigate or even prevent the wheel chock 100 from hitting the fixed swivel portion 212 or the surrounding wall 112 in some implementations. Other configurations and arrangements are possible. Among other things, one or more of the parts of the positioning arrangement 290 can be constructed and/or positioned differently. The positioning arrangement 290 can also be omitted in some implementations. Other variants are possible as well.

Figure 31:
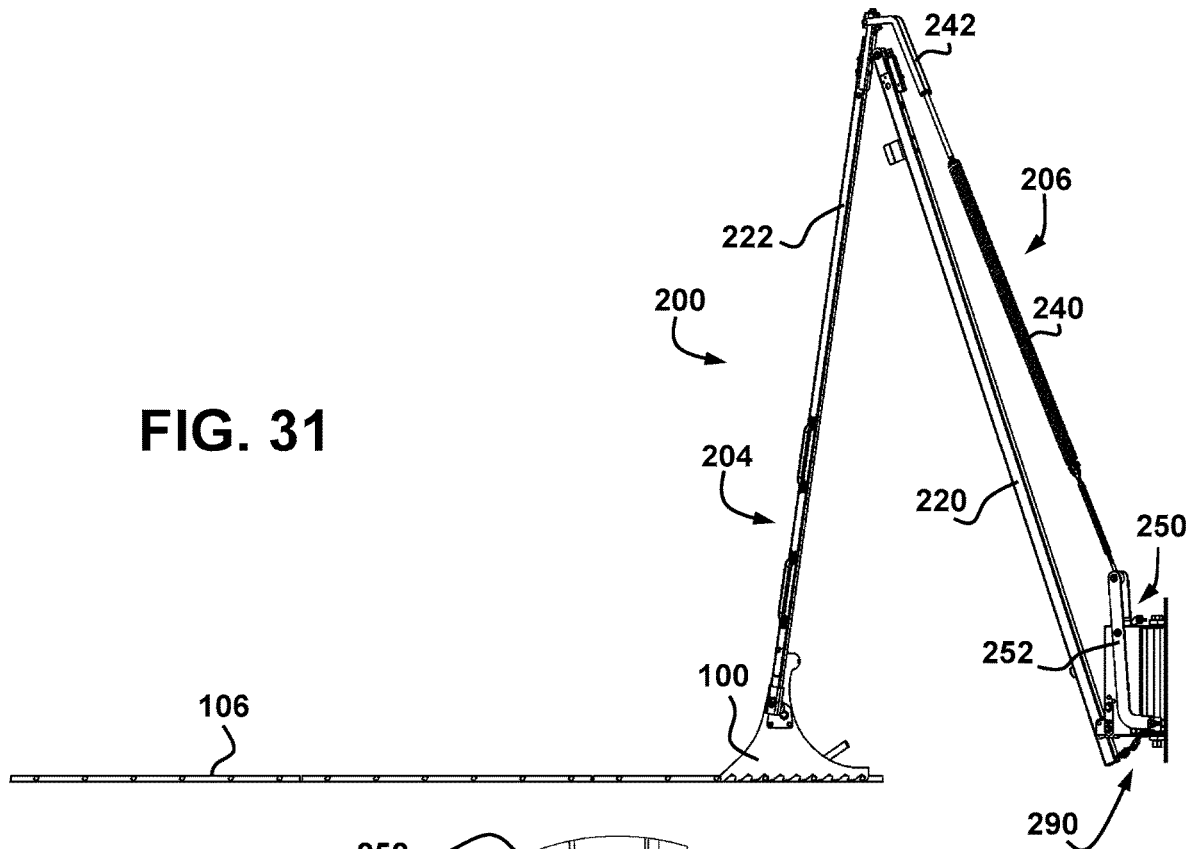
FIG. 31 is a side view showing the wheel chock handling unit in FIG. 29 when the wheel chock is set at a proximal position on the base plate.
Figure 32:
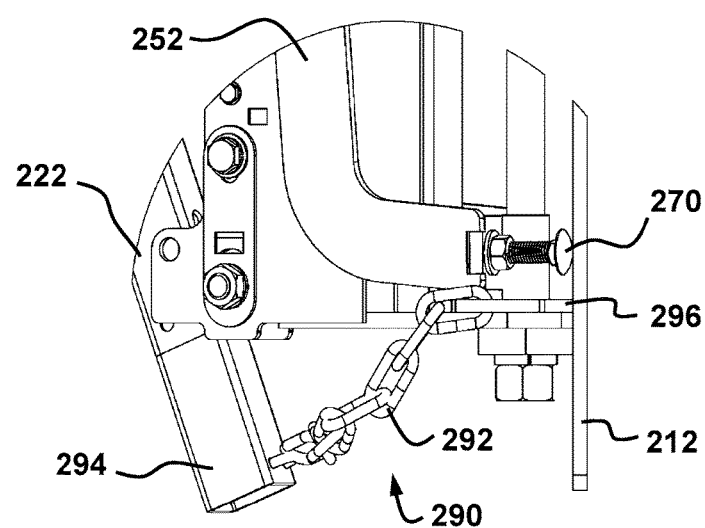
FIG. 32 is an enlarged side view of parts of the wheel chock handling unit in FIG. 31.

FIG. 31 is a side view showing the wheel chock handling unit 200 in FIG. 29 when the wheel chock 100 is set at a proximal position on the base plate 106. FIG. 32 is an enlarged side view of parts of the wheel chock handling unit 200 in FIG. 31. As can be seen, the chain 292 becomes loose when the proximal arm 220 is pivoted away from the substantially vertical position it has in the example when the wheel chock handling unit 200 is in a storage position.

FIG. 33 is a front view showing the wheel chock handling unit 200 in FIG. 31. FIG. 34 is an enlarged front view of parts at the base 202 of the wheel chock handling unit 200 in FIG. 33.

Figure 35:
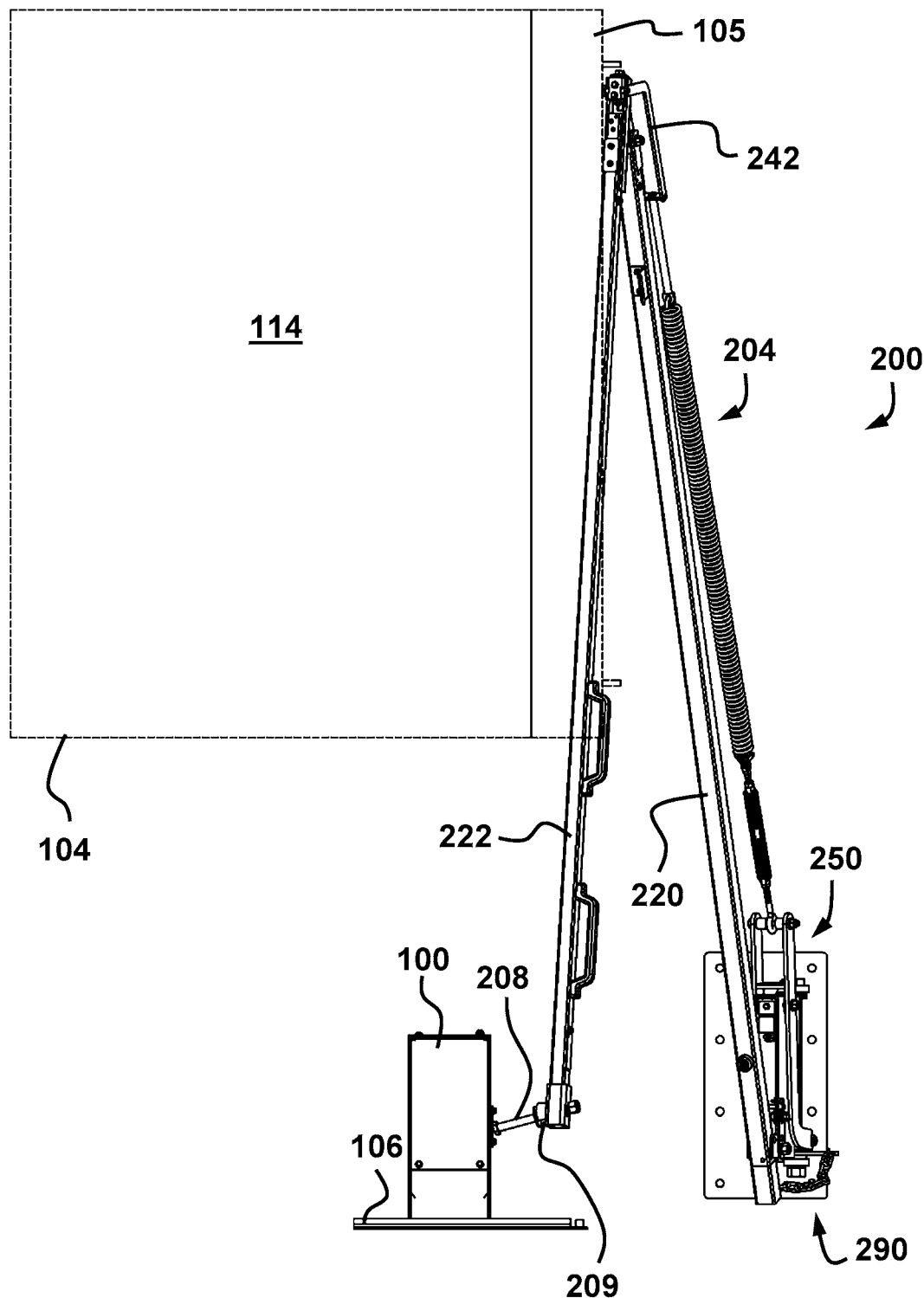
FIG. 35 is a view similar to FIG. 34 but including a schematic illustration of a generic vehicle door for the sake of explanation.

FIG. 35 is a view similar to FIG. 34 but including a schematic illustration of a generic vehicle door 105 for the sake of explanation. This door 105 can be one of the doors at the back of the cargo compartment 114 of the vehicle 104 illustrated in FIG. 1. Some doors, like the door 105 schematically illustrated in FIG. 35, may have flanges or the like projecting laterally from the top interior surface thereof. These projecting parts will extend laterally when the door 105 is open. In FIG. 35, the wheel chock handling unit 200 is very similar to the one shown in FIG. 2. The length of the arms 220, 222 and the shape of the top connector member 242 were dimensioned and shaped to fit right under the flange so as to mitigate contact between the flange and the top end of the arm assembly 204. The angle of the top portion of the top connector member 242 also contributes to the lower clearance. Other configurations and arrangements as possible. Among other things, some vehicles may have different kinds of doors and/or some of the doors may not necessarily have flanges near the top edge. Constructing the arm assembly 204 so as to remain below possible obstacles is essentially for the convenience of the end users and such design can be omitted in some implementations. Other variants are possible as well.

Figure 36:
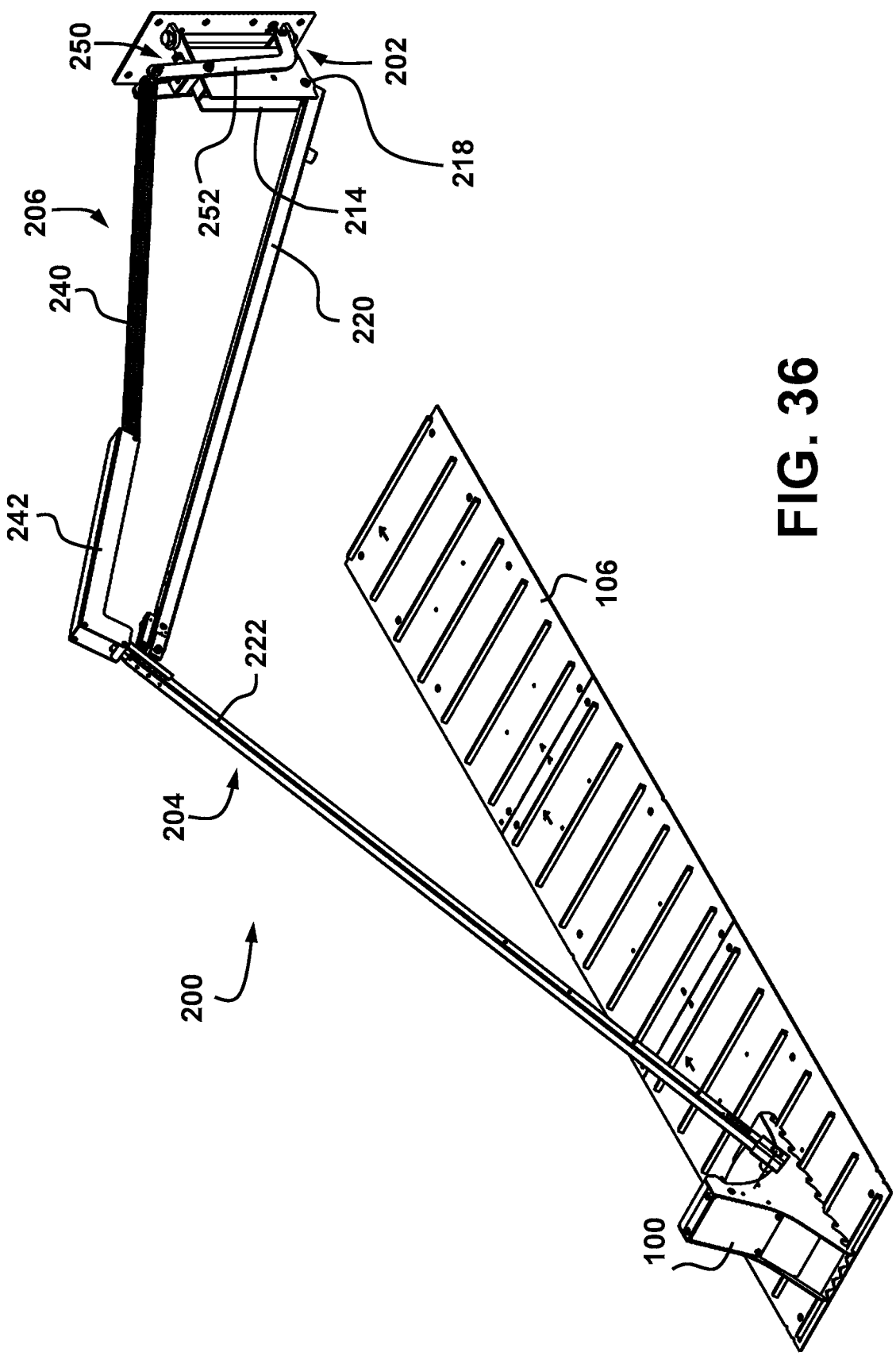
FIG. 36 is an isometric view showing another example of a wheel chock handling unit based on the proposed concept.

FIG. 36 is an isometric view showing another example of a wheel chock handling unit 200 based on the proposed concept. This example is relatively similar to the one shown in FIG. 2. However, the shape and configuration of the top connector member 242 are different, and there is no bottom connected member since the bottom end of the extension spring 240 is pivotally attached directly to the top end of the lever 252. Also, the movable portion 214 of the base 202 is slightly different since the proximal arm 220 will enter the space at the front end of the movable portion 214 at the storage position. Other configurations and arrangements are possible. Among other things, one or more of these features can be implemented in the example shown in FIGS. 2 to 35 and/or one or more of the features absent from the example shown in FIG. 36 can be implemented. Other variants are possible as well.

Figure 37:
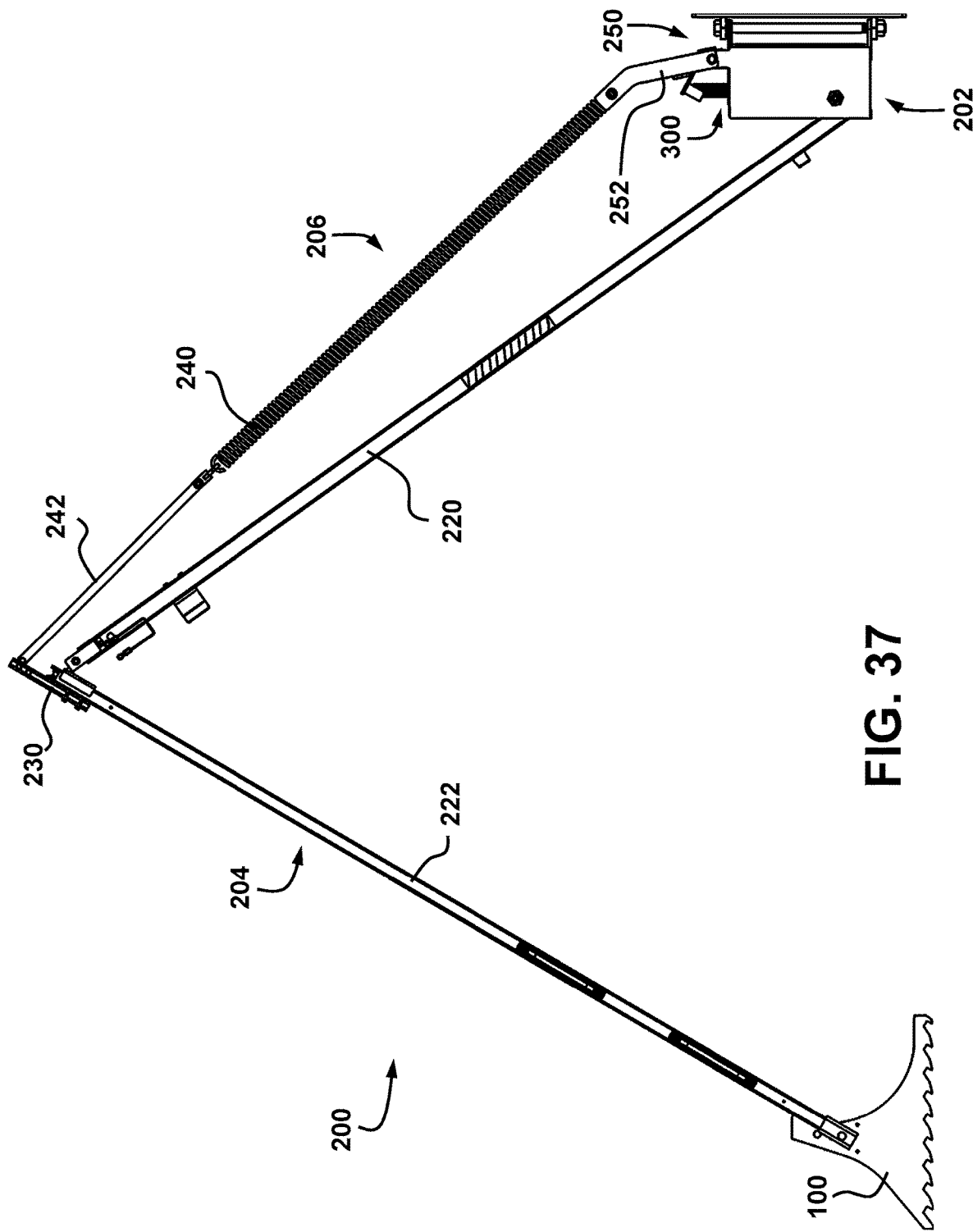
FIG. 37 is an isometric view showing another example of a wheel chock handling unit based on the proposed concept.
Figure 38:
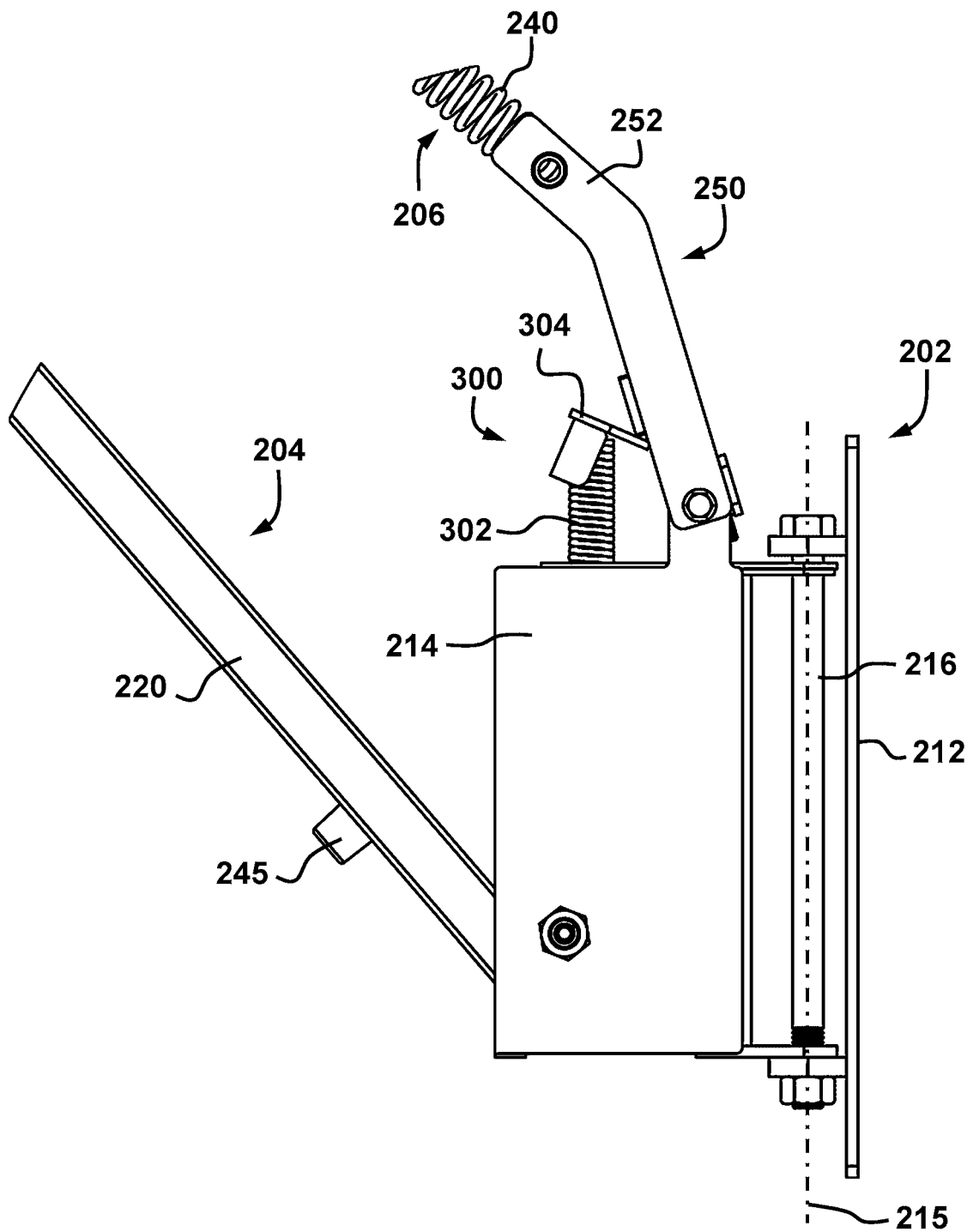
FIG. 38 is an enlarged isometric view of parts at the base of the wheel chock handling unit illustrated in FIG. 37.

FIG. 37 is an isometric view showing another example of a wheel chock handling unit 200 based on the proposed concept. FIG. 38 is an enlarged isometric view of parts at the base 202 of the wheel chock handling unit 200 in FIG. 37.

In the example shown in FIGS. 37 and 38, the force-compensation mechanism 250 includes a counterbalancing spring assembly 300 urging the second end of the leading section 254 of the lever 252 to pivot away from the arm assembly 204. The force-compensation mechanism 250 of this illustrated example does not include, among other things, a follower engaging a contact surface. The counterbalancing spring assembly 300 includes a compression spring 302, for instance a helical spring, mounted between the lever 252 and the base 202. The top end of the compression spring 302 engages a bracket 304 projecting in front of the lever 252. Other configurations and arrangements are possible. For instance, the compression spring 302 can be positioned elsewhere and/or be replaced by a similar mechanism, such as a resilient element made of an elastomeric material or the like. Other variants include using one or more torsion springs set between the lever 252 and the base 202. Additional variants can be devised as well.

The lever 252 in the illustrated example includes a forwardly-bended top portion at the end of which the bottom end of the main spring assembly 206 is pivotally mounted. The forwardly-bended top portion of this lever 252 thus positions the bottom end of the main spring assembly 206 further away from the wall 112. This feature could be implemented in other examples. Nevertheless, variants are possible, and the feature can also be omitted in some implementations.

In use, moving the arm assembly 204 from the storage position towards the extended position changes the relative position of the opposite ends of the main spring assembly 206 and the orientation of the force vector applied by the main spring assembly 206 on the lever 252. The angular position of the lever 252 will change to modify the force coming from the main spring assembly 206. The return force exerted by the compression spring 302 will vary based on the angular position of the lever 252 and, in general, will increase as the lever 252 pivots forward. The stiffness of the compression spring 302 can be selected to create the desired response. The lever 252 can have an unrestricted motion or almost unrestricted motion in some implementations. Alternatively, the force-compensation mechanism 250 can include one or more stoppers to limit the angular position of the lever 252 in the forward or the rearward direction, or both. A stopper can be a physical element against which the lever 252 abuts or can be the compression spring 302 when fully compressed. Other variants are possible.

FIG. 37 shows another example for the top connector member 242. This model is Y-shaped near the top portion to pass around the top end of the arms 220, 222. This top connector member 242 is not necessarily specific to the illustrated example and could be used in other implementations.

Figure 39:
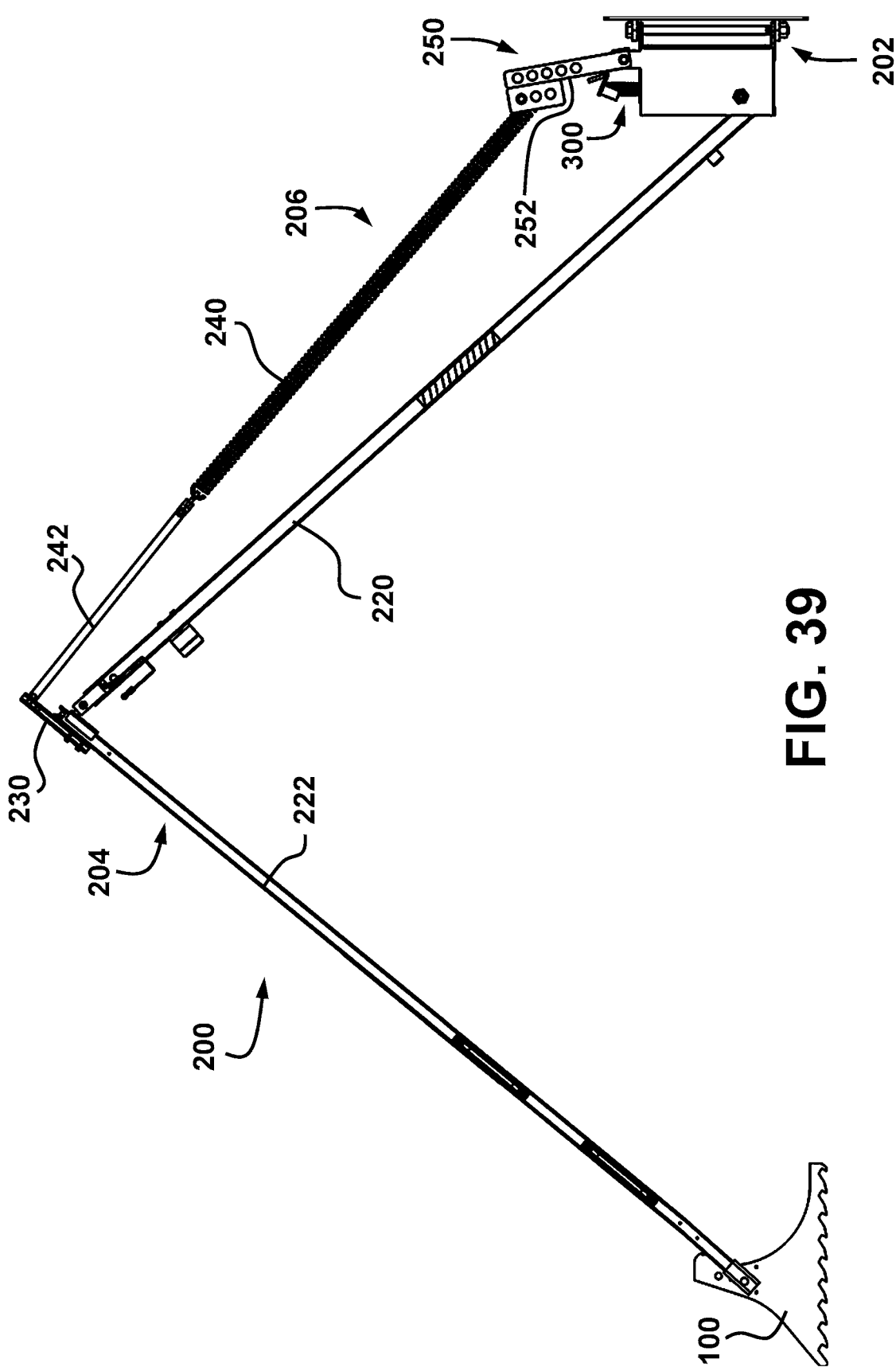
FIG. 39 is an isometric view showing another example of a wheel chock handling unit based on the proposed concept.
Figure 40:
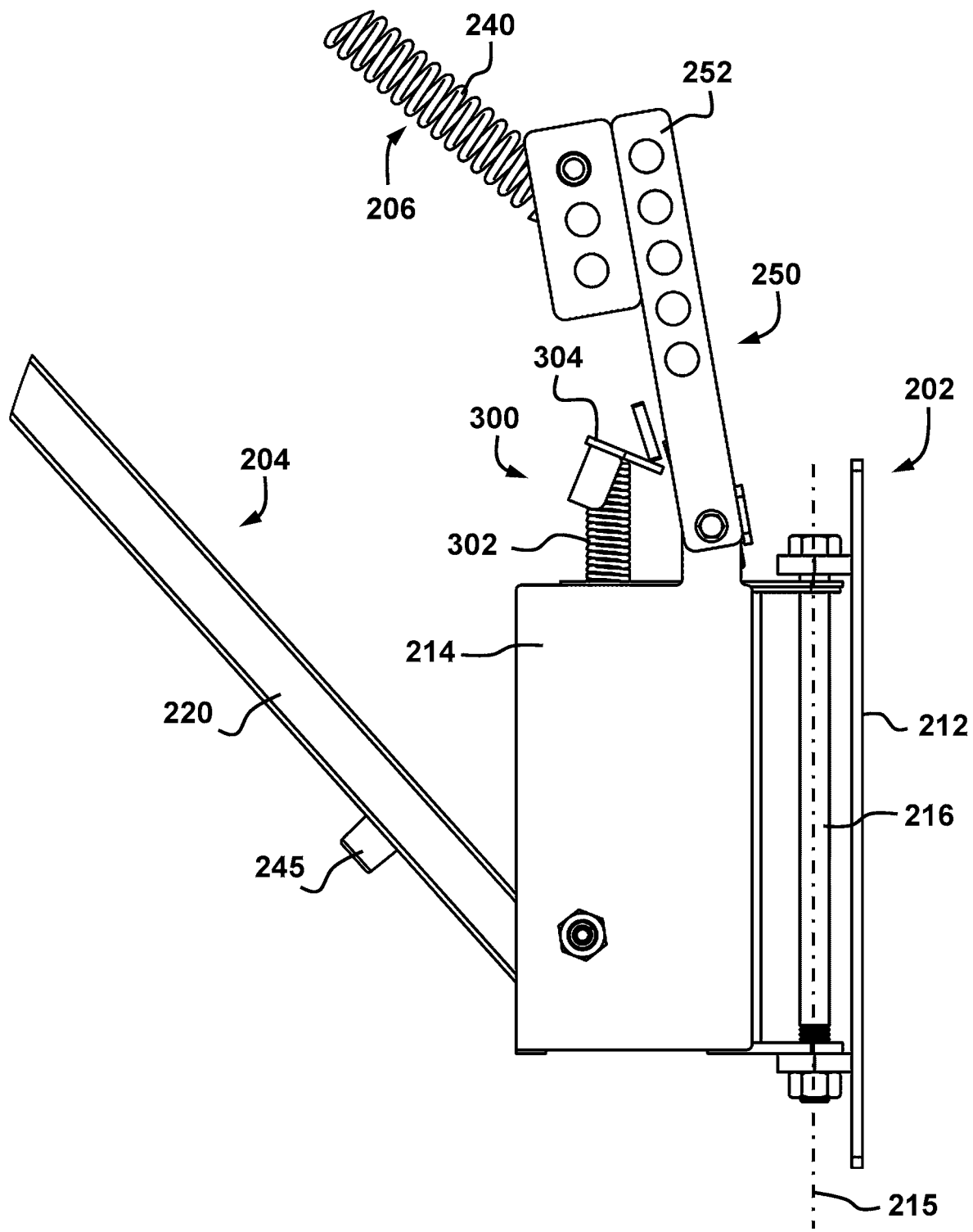
FIG. 40 is an enlarged isometric view of parts at the base of the wheel chock handling unit in FIG. 39.

FIG. 39 is an isometric view showing another example of a wheel chock handling unit 200 based on the proposed concept. FIG. 40 is an enlarged isometric view of parts at the base 202 of the wheel chock handling unit 200 in FIG. 39.

Figure 41:
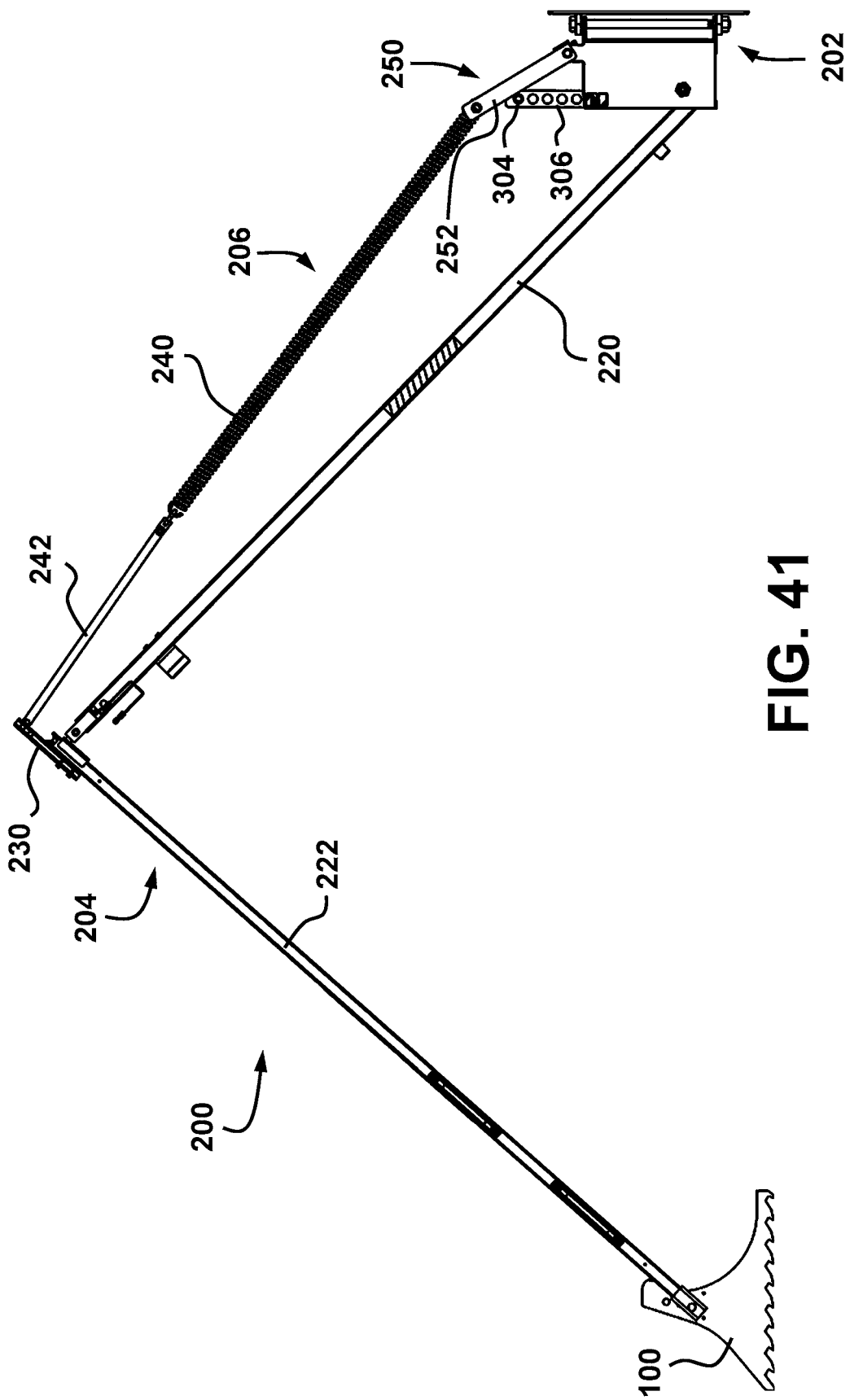
FIG. 41 is an isometric view showing another example of a wheel chock handling unit based on the proposed concept.
Figure 42:
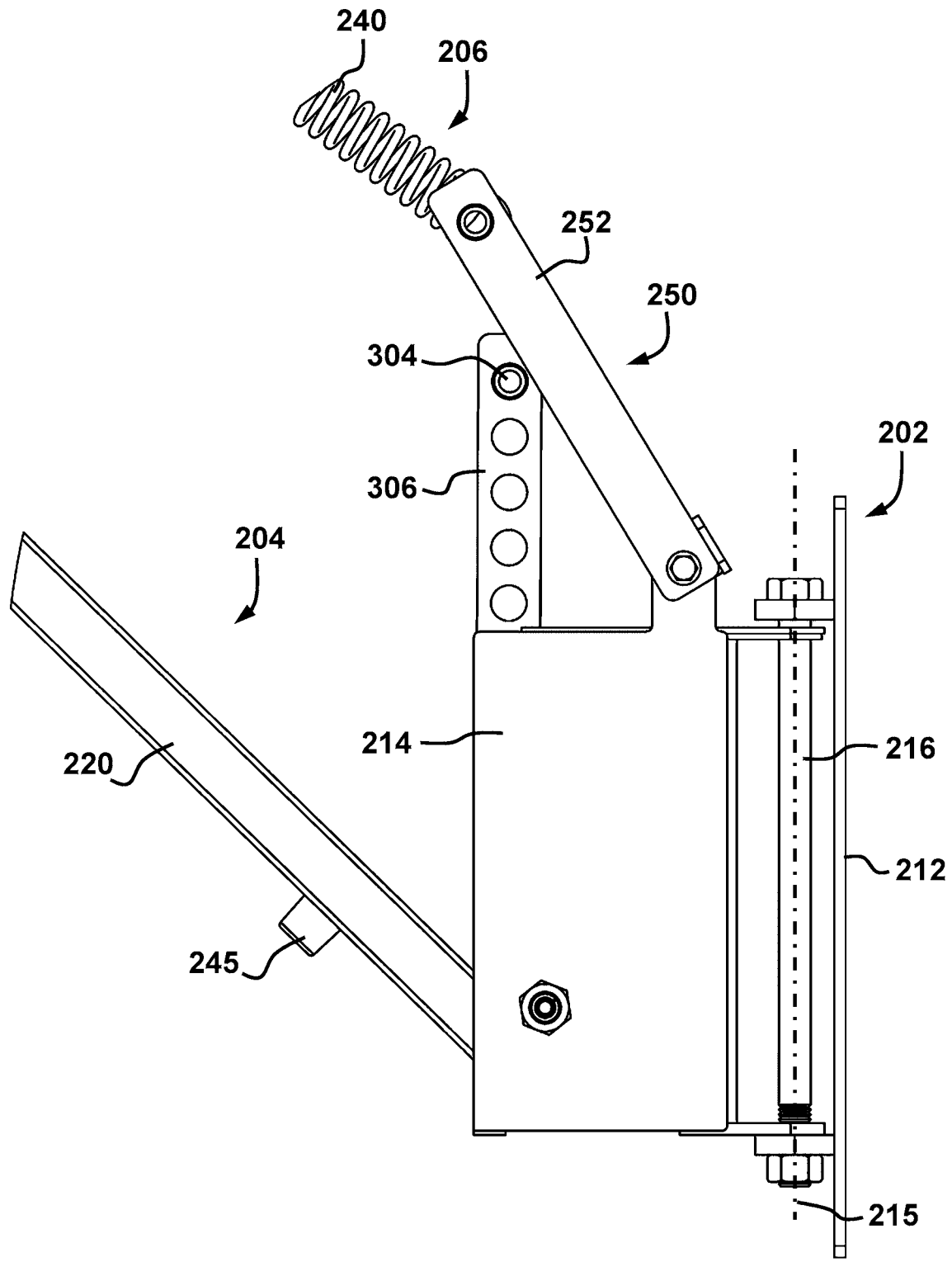
FIG. 42 is an enlarged isometric view of parts at the base of the wheel chock handling unit in FIG. 41.

FIG. 41 is an isometric view showing another example of a wheel chock handling unit 200 based on the proposed concept. FIG. 42 is an enlarged isometric view of parts at the base 202 of the wheel chock handling unit 200 in FIG. 41.

Overall, implementing the proposed concept results in wheel chock handling units 200 that are more versatile and that can perform much better over the entire range of operation than ever before.

The present detailed description and the appended figures are meant to be exemplary only, and a skilled person will recognize that many changes can be made while still remaining within the proposed concept.

REFERENCE NUMERALS 100 wheel chock
100a tooth (under the wheel chock)
102 wheel
104 vehicle
105 door (of the vehicle)
106 base plate
106a stopper (on the base plate)
108 longitudinal axis
110 loading dock
112 wall
113 cushion 114 cargo compartment
116 adjacent wheel
150 wheel chock restraint system
200 wheel chock handling unit
202 base
204 articulated cantilever arm assembly
206 main spring assembly
208 linking member
209 ball joint
210 swivel support
212 fixed portion (of swivel support)
212a hole
214 movable portion (of swivel support)
214a vertical plate (of movable portion)
214b top and bottom intermediary member (of movable portion)
215 vertical pivot axis
216 vertical axle (of swivel support)
218 bottom joint
219 horizontal pivot axis (of bottom joint)
220 proximal arm
22 height adjustment arrangement
222 distal arm
223 handle
224 first upper joint
226 horizontal pivot axis (of first upper joint)
228 stopper
229 holding member
230 mechanical arrangement
231 top member
232 bottom member
233 transversal axis
234 elongated guide
235 bolt
236 fastener
237 guide bolt
238 sleeve
239 laterally projecting member
240 extension spring
242 top connector member
243 bottom connector member
244 resilient spacer
245 resilient bumper
246 second upper joint
248 horizontal pivot axis (of second upper joint)
250 force-compensation mechanism
252 lever
253 horizontal pivot axis (of lever)
254 leading section
256 trailing section
258 bracket
260 sleeve
270 follower
272 contact surface
280 cable
290 positioning arrangement
292 chain
294 bottom extension
296 flange
300 counterbalancing spring assembly
302 compression spring (of counterbalancing spring assembly)
304 bracket
306 stopper
308 elongated member

What is claimed is:

1. A wheel chock handling unit for use with a wheel chock, the wheel chock handling unit including:
a base;
an articulated cantilever arm assembly having opposite first and second ends, the first end being pivotally mounted to the base for angular displacement of the arm assembly in a substantially vertical plane between a storage position and an extended position, the arm assembly comprising:
a proximal arm; and
a distal arm;
the proximal arm having opposite top and bottom ends and the distal arm having opposite top and bottom ends, the first end of the arm assembly corresponding to the bottom end of the proximal arm and the second end of the arm assembly corresponding to the bottom end of the distal arm;
the proximal and distal arms being pivotally connected for pivoting the distal arm about a pivot axis perpendicular to the vertical plane;
a pivoting assembly laterally offset from the pivot axis of the arm assembly comprising:
a first member secured to the distal arm, having a first member top end and a bottom end and a longitudinal axis extending therebetween; and
a second member secured to the first member at a first position that is offset from the first member top end along the longitudinal axis, and configured to be pivotally connected to the proximal arm;
a main spring assembly extending between the arm assembly and the base, comprising:
a rigid structural connector member connected to the pivoting assembly at a position above the first position, the connector member having a portion extending towards the base; and
at least one spring having:
a top end operatively connected to the portion of the connector member extending towards the base; and
a bottom end operatively connected to the base.

2. The wheel chock handling unit as defined in claim 1, wherein the rigid structural connector member is pivotally connected to the pivoting assembly at a position vertically aligned farther from said base than the first position.

3. The wheel chock handling unit as defined in claim 1, wherein the rigid structural connector member is pivotally connected to the pivoting assembly at a position horizontally aligned farther from said base than the first position.

4. The wheel chock handling unit as defined in claim 1, wherein said at least one spring assembly comprises at least one counterbalancing extension spring mounted between the connector member and the base.

5. The wheel chock handling unit as defined in claim 1, wherein the base includes a swivel support for angular displacement about a substantially vertical axis.

6. A wheel chock restraint system including:
a wheel chock; and
the wheel chock handling unit as defined in claim 1.

7. The wheel chock restraint system as defined in claim 6; further including:
an elongated base plate extending along a longitudinal axis, the base plate having a plurality of stoppers transversely disposed on the base plate and that are spaced apart from one another along the longitudinal axis, the stoppers being configured and disposed to cooperate with corresponding teeth provided under the wheel chock.

8. A wheel chock handling unit for use with a wheel chock, the wheel chock handling unit including:
a base;
an articulated cantilever arm assembly having opposite first and second ends, the first end being pivotally mounted to the base for angular displacement of the arm assembly in a substantially vertical plane between a storage position and an extended position, the arm assembly comprising:
a proximal arm; and
a distal arm;
the proximal arm having opposite top and bottom ends and the distal arm having opposite top and bottom ends, the first end of the arm assembly corresponding to the bottom end of the proximal arm and the second end of the arm assembly corresponding to the bottom end of the distal arm;
the proximal and distal arms being pivotally connected for pivoting the distal arm about a pivot axis perpendicular to the vertical plane;
a pivoting assembly comprising:
a first member configured to be secured to the distal arm, having a top end and a bottom end and a longitudinal axis extending therebetween; and
a second member configured to be secured to the first member at a first position that is offset from the top end of the first member along the longitudinal axis, and configured to be pivotally connected to the proximal arm;
a main spring assembly extending between the arm assembly and the base, comprising:
a rigid structural connector member connected to the pivoting assembly at a position above the first position, the connector member having a portion extending towards the base; and
at least one spring having:
a top end operatively connected to the portion of the connector member tending towards the base; and
a bottom end operatively connected to the base,
wherein the pivoting assembly has an adjustable stopper to limit a range of pivot of the distal arm.

9. A wheel chock handling unit for use with a wheel chock, the wheel chock handling unit including:
a base;
an articulated cantilever arm assembly having opposite first and second ends, the first end being pivotally mounted to the base for angular displacement of the arm assembly in a substantially vertical plane between a storage position and an extended position;
wherein the arm assembly includes a proximal arm and a distal arm that are operatively connected at an upper joint, the proximal arm having opposite top and bottom ends and the distal arm having opposite top and bottom ends, the first end of the arm assembly corresponding to the bottom end of the proximal arm and the second end of the arm assembly corresponding to the bottom end of the distal arm;
wherein the upper joint is configured to allow pivotal movement of the distal arm with respect co the proximal arm about a pivot axis;
a pivoting assembly laterally offset from the pivot axis of the arm assembly comprising:
a first member secured to the distal arm; and
a second member secured to the proximal arm and pivotally connected to the first member; and
a main spring assembly extending between the arm assembly and the base and configured to exert a force above the upper joint for causing pivotal movement of the distal arm about the pivot axis, comprising:
a rigid structural connector member connected to the distal arm above the upper joint, the connector member having a portion extending towards the base; and
at least one spring having:
a top end operatively connected to the portion of the connector member extending towards the base; and
a bottom end operatively connected to the base.

10. The wheel chock handling unit as defined in claim 9, wherein the rigid structural connector member is pivotally connected to the distal arm at a position vertically aligned farther from said base than the upper joint.

11. The wheel chock handling unit as defined in claim 9, wherein the rigid structural connector member is pivotally connected to the distal arm at a position horizontally aligned farther from said base than said first position.

12. The wheel chock handling unit as defined in claim 9, wherein said at least one spring assembly comprises at least one counterbalancing extension spring mounted between the connector member and the base.

13. The wheel chock handling unit as defined in claim 9, wherein the base includes a swivel support for angular displacement about a substantially vertical axis.

14. A wheel chock restraint system including:
a wheel chock; and
the wheel chock handling unit as defined in claim 9.

15. The wheel chock restraint system as defined in claim 14, further including:
an elongated base plate extending along a longitudinal axis, the base plate having a plurality of stoppers transversely disposed on the base plate and that are spaced apart from one another along the longitudinal axis, the stoppers being configured and disposed to cooperate with corresponding teeth provided under the wheel chock.

16. A wheel chock handling unit for use with a chock, the wheel chock handling unit including:
a base;
an articulated cantilever arm assembly having opposite first and second ends, the first end being pivotally mounted to the base for angular displacement of the arm assembly in a substantially vertical plane between a storage position and an extended position;
wherein the arm assembly includes a proximal arm and a distal arm that are operatively connected at an upper joint, the proximal arm having opposite top and bottom ends and the distal arm having opposite top and bottom ends, the first end of the arm assembly corresponding to the bottom end of the proximal arm and the second end of the arm assembly corresponding to the bottom end of the distal arm;
wherein the upper joint is configured to allow pivotal movement of the distal arm with respect to the proximal arm about a pivot axis; and
a main spring assembly extending between the arm assembly and the base and configured to exert a force above the upper joint for causing pivotal movement of the distal arm about the pivot axis comprising:
a rigid structural connector member connected to the distal arm above the upper joint, the connector member having a portion extending towards the base; and
at least one spring having:
a top end operatively connected to the portion of the connector member extending towards the base; and a bottom end operatively connected to the base,
wherein the pivoting assembly has an adjustable stopper to limit a range of pivot of the distal arm.

* * * * *